US007490881B2

(12) United States Patent
Null et al.

(10) Patent No.: US 7,490,881 B2
(45) Date of Patent: Feb. 17, 2009

(54) LONG TRAVEL GRIPPER

(75) Inventors: Lyle A. Null, Markle, IN (US); Matthew R. Williams, Fort Wayne, IN (US)

(73) Assignee: PHD, Inc., Fort Wayne, IN (US)

( * ) Notice: Subject to any disclaimer, the term of this patent is extended or adjusted under 35 U.S.C. 154(b) by 249 days.

(21) Appl. No.: 11/229,780

(22) Filed: Sep. 19, 2005

(65) Prior Publication Data

US 2006/0065116 A1 Mar. 30, 2006

Related U.S. Application Data

(60) Provisional application No. 60/611,336, filed on Sep. 20, 2004.

(51) Int. Cl.
*B25J 15/00* (2006.01)
*B25J 13/08* (2006.01)

(52) U.S. Cl. ...................... 294/88; 294/119.1; 294/907; 901/37; 901/46

(58) Field of Classification Search ................... 294/88, 294/119.1, 907; 901/37, 46; 269/25-27, 269/33, 35
See application file for complete search history.

(56) References Cited

U.S. PATENT DOCUMENTS

| | | | |
|---|---|---|---|
| 4,577,898 | A | 3/1986 | Nusbaumer et al. |
| 4,591,199 | A | 5/1986 | Zajac |
| 4,593,948 | A | 6/1986 | Borcea et al. |
| 4,607,873 | A | 8/1986 | Nusbaumer et al. |
| 4,611,846 | A | 9/1986 | Feiber et al. |
| 4,647,100 | A | 3/1987 | Lessway |
| 4,653,793 | A | 3/1987 | Guinot et al. |
| 4,697,839 | A | 10/1987 | Fischer |
| 4,723,806 | A | 2/1988 | Yuda |
| 4,765,669 | A | 8/1988 | Meier |
| 4,768,821 | A | 9/1988 | Hucul et al. |
| 4,865,375 | A | 9/1989 | Laub et al. |
| 4,892,344 | A | 1/1990 | Takada et al. |
| 4,913,481 | A | 4/1990 | Chin et al. |
| 5,090,757 | A | 2/1992 | Huber et al. |
| 5,125,708 | A | 6/1992 | Borcea et al. |
| 5,163,729 | A | 11/1992 | Borcea et al. |
| 5,330,167 | A | 7/1994 | Plumb |

(Continued)

FOREIGN PATENT DOCUMENTS

| | | |
|---|---|---|
| DE | 0239751 | 10/1986 |

(Continued)

OTHER PUBLICATIONS

EPO, International Search Report, Dec. 21, 2007.

(Continued)

*Primary Examiner*—Dean J Kramer
(74) *Attorney, Agent, or Firm*—Barnes & Thornburg LLP

(57) ABSTRACT

A long travel gripper is provided which has first and second end caps, first, second and third guide rails, first and second jaws, and first and second piston assemblies. The first, second and third guide rails extend between the first and second end caps. The first and second jaws, each receive, and move rectilinearly along, the first, second and third guide rails. The first and second piston assemblies each include first and second piston rods and pistons, respectively.

13 Claims, 30 Drawing Sheets

U.S. PATENT DOCUMENTS

| | | | | |
|---|---|---|---|---|
| 5,529,359 | A | 6/1996 | Borcea et al. | |
| 5,595,413 | A | 1/1997 | McGeachy et al. | |
| 5,609,381 | A * | 3/1997 | Thom et al. | 294/119.1 |
| 5,620,223 | A | 4/1997 | Mills | |
| 5,657,973 | A | 8/1997 | Zajac, Jr. et al. | |
| 5,755,475 | A | 5/1998 | Zajac, Jr. | |
| 5,839,770 | A | 11/1998 | Zajac, Jr. et al. | |
| 5,967,581 | A | 10/1999 | Bertini | |
| 6,123,375 | A | 9/2000 | Fussey et al. | |
| 6,224,123 | B1 * | 5/2001 | Ubele et al. | 294/119.1 |
| 6,309,003 | B1 | 10/2001 | Bertini | |
| 6,585,247 | B2 | 7/2003 | Mattox et al. | |
| 6,598,918 | B1 | 7/2003 | Null et al. | |
| 7,174,614 | B2 | 2/2007 | Martz et al. | |

FOREIGN PATENT DOCUMENTS

| | | | |
|---|---|---|---|
| DE | 103 33 408 | B3 | 7/2004 |
| GB | 903 737 | A | 8/1962 |
| SU | 1470645 | | 4/1989 |

OTHER PUBLICATIONS

International Search Report—May 14, 2007.

Robohand, Inc., Custom Products Rim Gripper Series, brochure (3 pages), (no date) and Web page (1 page).

PHD, Inc, PHD Solutions for Industrial Automation, brochure, 2003, pp. 6A-100 through 6A-109 and CAD drawing (2 pages).

* cited by examiner

PRIOR ART
FIG. 29
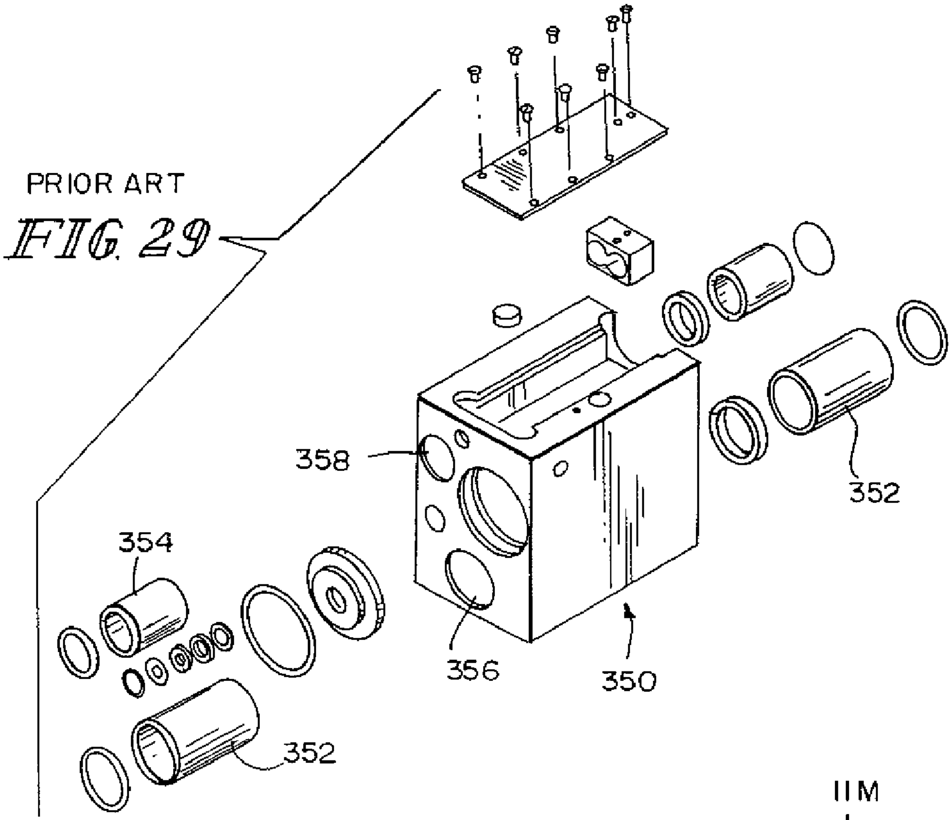
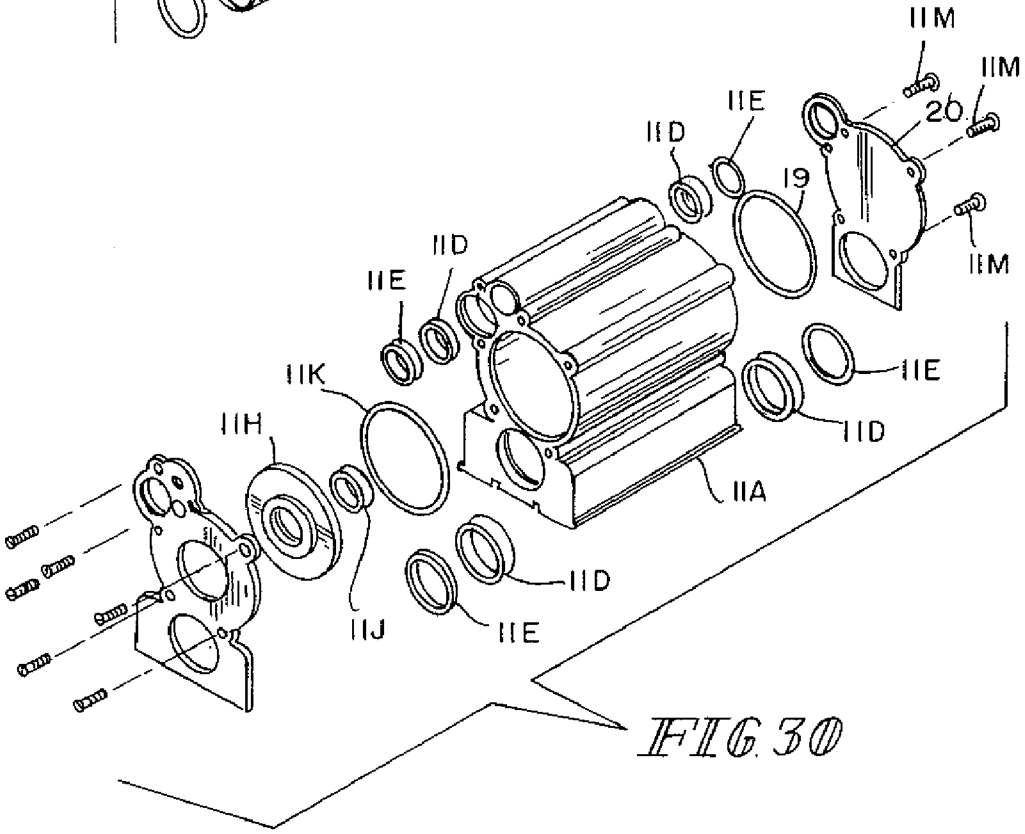
FIG. 30

PRIOR ART
FIG. 31
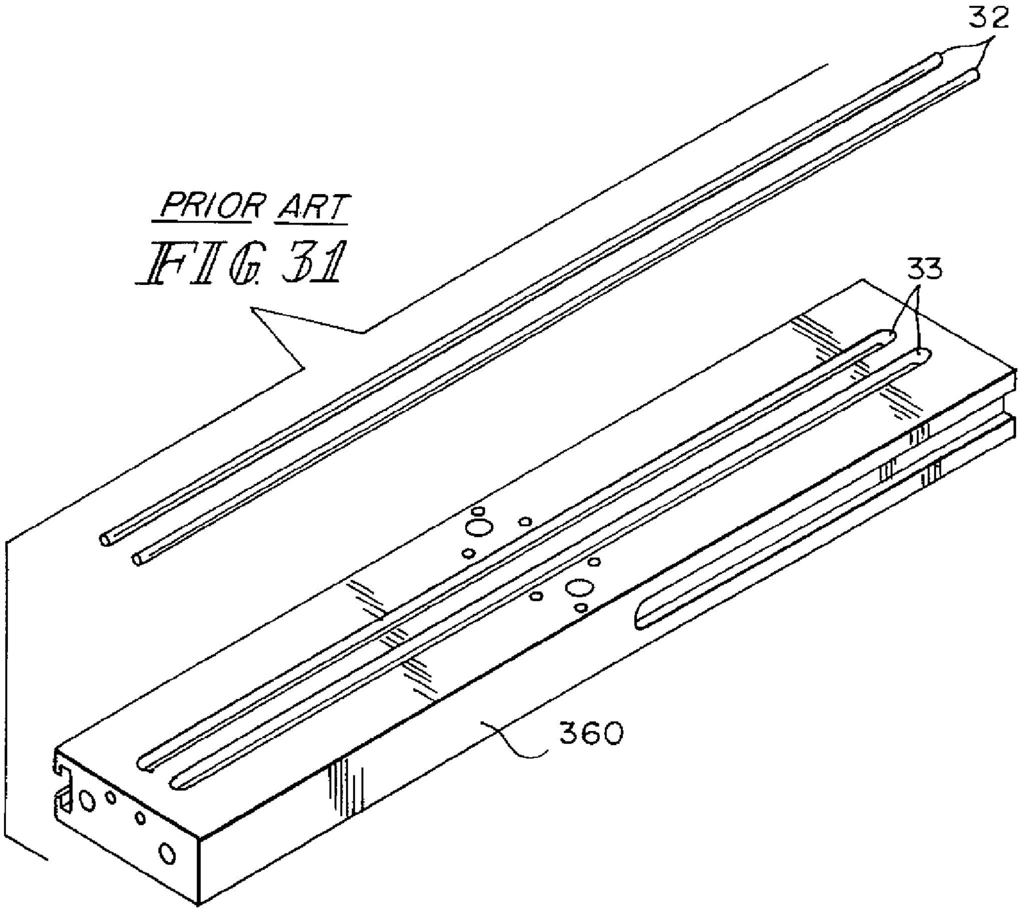
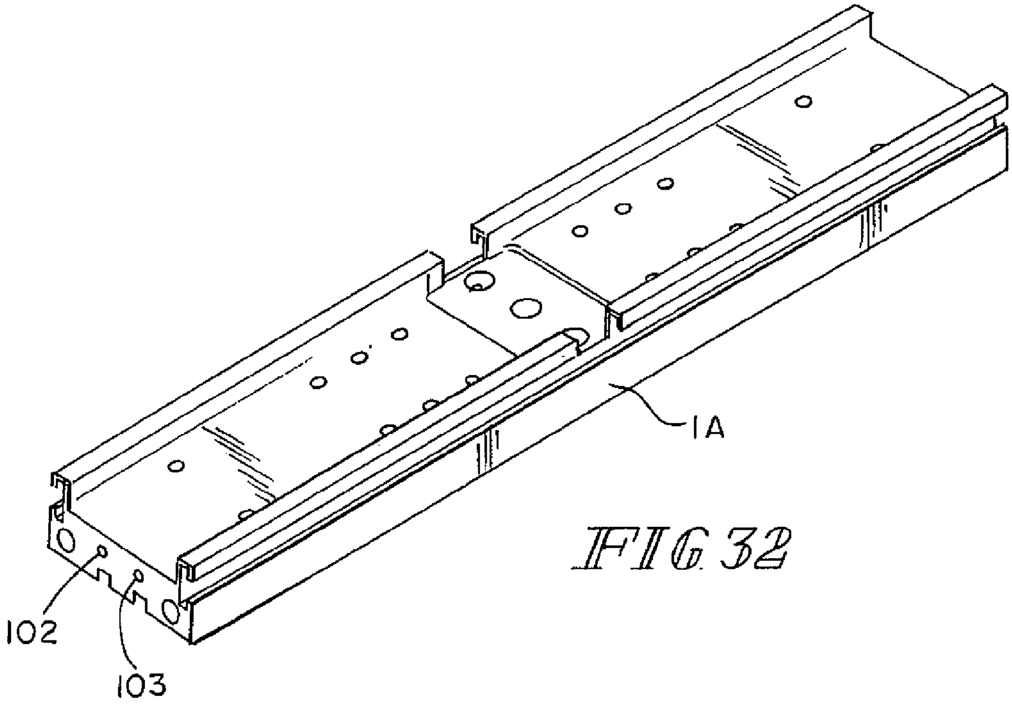
FIG. 32

3
3A
3B
9
10
11
12
13A
13B
400
402
403
404

3
3A
3B
3B
9
9A
10
10A
11
12
102
103
500
502
504
504
504
504
506
506
506
506

LONG TRAVEL GRIPPER

RELATED APPLICATIONS

The present application is related to and claims priority to U.S. Provisional Patent Application Ser. No. 60/611,336, filed on Sep. 20, 2004, entitled IMPROVED RIM GRIPPER ASSEMBLY. The subject matter disclosed in that provisional application is hereby expressly incorporated into the present application by reference.

TECHNICAL FIELD

The present disclosure relates to clamp or gripper devices and methods of manufacturing the same. More particularly, the present disclosure is related to grippers that have rectilinearly moving jaws that open and close upon a workpiece, and to grippers having components manufactured via extrusion processes.

BACKGROUND AND SUMMARY

Rim or long travel gripper assemblies are typically characterized by their relatively narrow width and long jaw travel, and having a wide range of applications in a limited space. For example, such grippers are useful for gripping tire rims and other objects. The movement of the jaw arms is controlled by their travel along a guide rail. Because of the rectilinear jaw motion, these grippers can be useful for both internal and external gripping applications. Actuation of the gripper is typically by a hydraulic or pneumatic piston assembly.

Manufacture of rim or long travel grippers involves machining metal parts including jaws and bases. Because typical grippers of this type require many air passages and bores, machining those passages is a preferred method of manufacture. This type of manufacture, however, can be costly and time consuming with the resulting structures being relatively heavy. In addition, such milled structures require additional components like bearing inserts in order to be complete.

It would be useful to provide, as one illustrative embodiment, an improved long travel gripper assembly that provides parallel-spaced jaw guides that are also collectively triangularly-positioned to provide a center of torsion for the actuation means of the gripper. The triangularly-positioned guide rail configuration makes for an inherently symmetric, and possibly stiffer and stronger structure than prior art designs. Because of the symmetry with respect to the piston rods, the center of torsion of the jaws is about coincident with the center line of the piston rod. Thus, twisting of the jaws will merely rotate them about the center line of the piston rod, rather than apply a torque or other force against the piston, rod, or other components which could sustain damage or wear prematurely. This design may also reduce the risk of leaking in the jaws by limiting distortion of the piston seals that would otherwise result as the piston bore is pushed laterally against the seal.

It would also be beneficial in other embodiments, to provide jaw arms and/or other components of the long travel gripper assembly that are manufactured through an extrusion process. This process may create the desired bores and shapes necessary for such structures, while decreasing the gripper's relative weight and cost.

Accordingly, an illustrative embodiment of the present disclosure provides a long travel gripper which comprises first and second end caps, first, second and third guide rails, first and second jaws, and first and second piston assemblies.

The first, second and third guide rails extend between the first and second end caps and are positioned at parallelly spaced and at acute angles to each other. The first and second jaws, each receive, and move rectilinearly along, the first, second and third guide rails. The first piston assembly comprises a first piston rod and piston. The first piston rod is located between the first, second and third guide rails, wherein at least a portion of the first piston rod is disposed in a portion of the first jaw. The first piston is coupled to the first piston rod, is located in a cavity in the first jaw, and assists moving the first jaw. The second piston assembly comprises a second piston rod and piston. The second piston rod is located between the first, second and third guide rails, wherein at least a portion of the second piston rod is disposed in a portion of the second jaw. The second piston is coupled to the second piston rod, is located in a cavity in the second jaw, and assists moving the second jaw.

In the above and other illustrative embodiments, the long travel gripper may also comprise: the first piston rod being located at a center of torsion between the first, second and third guide rails, and the second piston rod being located at a center of torsion between the first, second and third guide rails; the first piston rod being coupled to the first end cap and the second piston rod being attached to the second end cap; a base that extends between the first and second end caps, wherein the base comprises at least one fluid passage longitudinally disposed there through, and wherein the base and the at least one fluid passage being formed via an extrusion process; a synchronizing assembly that synchronizes movement of the first and second jaws; a sensor assembly that detects positioning of the synchronizing assembly to determine positioning of the first and second jaws—the first piston further comprising first and second seals spaced apart from each other and disposed about the periphery of the first piston—and a support ring located about the periphery of the first piston between the first and second seals, wherein the support ring is movable with respect to the piston; the support ring being located in a channel disposed about the periphery of the first piston, and is configured to be movable within the channel; a single power source supplying power to the first and second pistons which move their respective first and second jaws; the single power source being a fluid power source; fluid ports provided on the first and second end caps—a base that extends between the first and second end caps that further comprises open and close fluid passages that are in communication with their respective open and close ports, and are in fluid communication with the first and second pistons to move the first and second jaws—and at least two power supplies to independently control the first and second jaws, wherein a first power supply distributes power to the first jaw and the second power supply distributes power to the second jaw; and the base comprising a key configured to engage a receiver located on the first end cap for selective positioning of the base relative thereto.

An illustrative embodiment of a method of manufacturing a long travel gripper is also provided. This method comprises the steps of: providing first and second end caps and at least one guide rail longitudinally extending between the first and second end caps; and, forming first and second jaws by extruding the jaws, wherein at least one cavity is formed in each jaw by extruding the same.

In the above and other illustrative embodiments, the method of manufacturing the long travel gripper also comprises: the cavity being configured to receive a piston; the first and second caps being attachable to an end of their respective first and second jaws and configured to cover at least a portion of an opening that is part of the extruded cavity formed in each of the first and second jaws; and forming a guide rail passage by extruding it in the first and second jaws; and applying a bearing surface to the guide rail passage in each of the first and second jaws.

Another illustrative embodiment of a method of manufacturing a long travel gripper is provided, the method comprises the steps of: providing first and second end caps, a plurality of guide rails longitudinally extending between the first and second end caps, and first and second jaws; extruding a base member; wherein at least one fluid passage is longitudinally formed in the base member during extruding the base member; and locating the base member between the first and second end caps.

In the above and other illustrative embodiments, the method of manufacturing the long travel gripper also comprises: the at least one fluid passage in the base being extruded the length of base member; the at least one fluid passage in the base forming a first fluid passage and a second air passage, wherein fluid is supplied to the first and second fluid passages to move the first and second jaws between open and closed positions; and providing a piston assembly for moving the jaws between open and closed positions, wherein the piston assembly comprises a piston rod that is formed by extruding it along with at least first and second collinear passages therein.

Additional features and advantages of the long travel gripper assembly will become apparent to those skilled in the art upon consideration of the several embodiments disclosed in the following detailed descriptions exemplifying the best mode of carrying out the long travel gripper assembly as presently perceived.

BRIEF DESCRIPTION OF DRAWINGS

The present disclosure will be described hereafter with reference to the attached drawings which are given as non-limiting examples only, in which:

FIG. 29 is an exploded perspective view of a prior art jaw arm;

FIG. 30 is an exploded perspective view of an extruded jaw arm;

FIG. 31 is an exploded perspective view of a prior art base assembly;

FIG. 32 is a perspective view of an extruded base assembly;

Corresponding reference characters indicate corresponding parts throughout the several views. The exemplification set out herein illustrates embodiments of the long travel gripper, and such exemplification is not to be construed as limiting the scope of the long travel gripper in any manner.

DESCRIPTION OF ILLUSTRATIVE EMBODIMENTS

Figure 1:
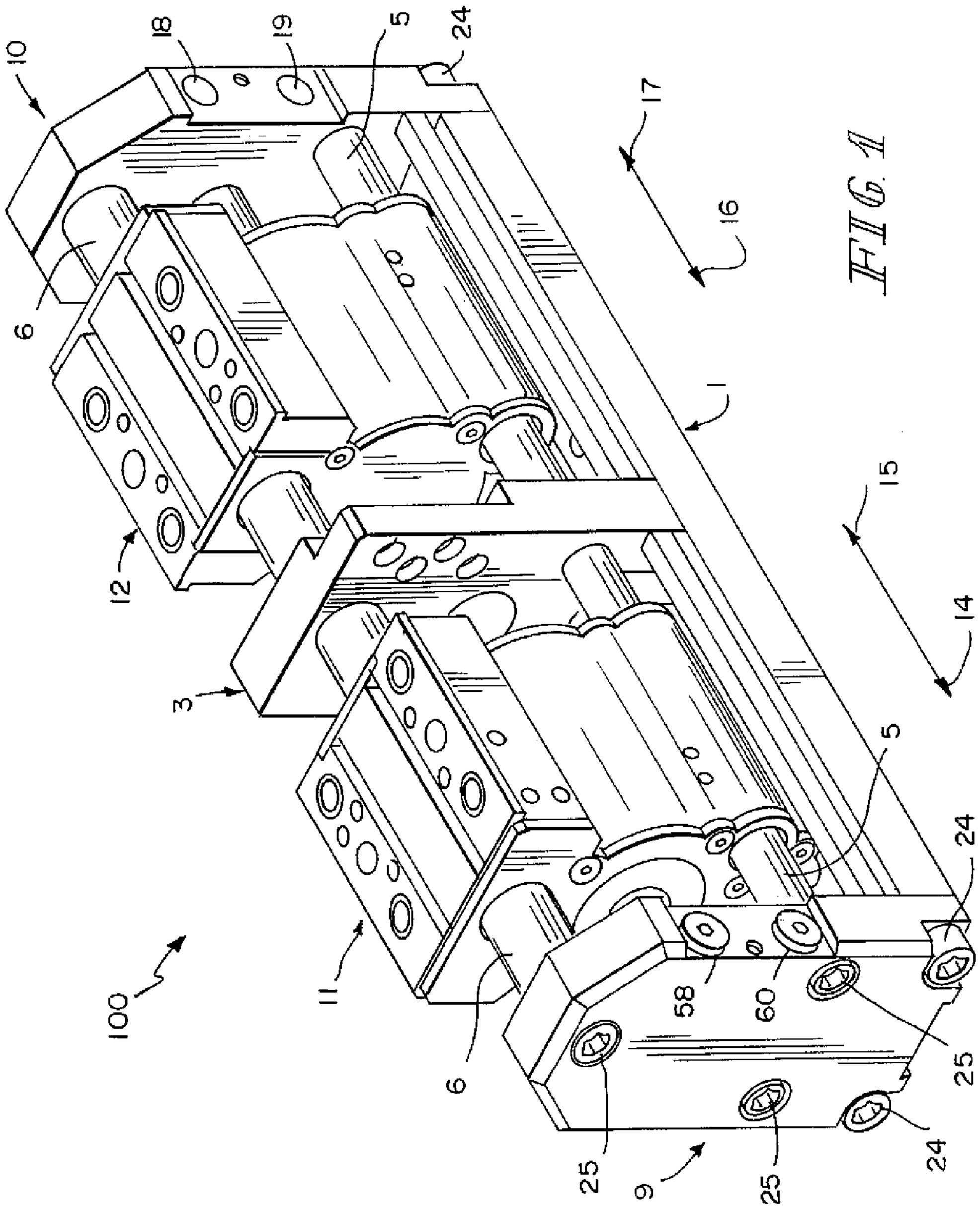
FIG. 1 is a perspective view of an illustrative embodiment of a long travel gripper.

An illustrative embodiment of a rim or long travel gripper 100 is shown in FIG. 1. The long travel gripper illustratively comprises a base assembly 1, a center plate assembly 3, end cap assemblies 9 and 10, and jaw assemblies 11 and 12. In this illustrative embodiment, jaw assemblies 11 and 12 are configured to move in rectilinearly opposed directions 14 and 17, and 15 and 16. In other words, when assembly 11 moves in direction 14, assembly 12 moves in direction 17. This illustratively opens the jaw. Conversely, when assembly 11 moves in direction 15, assembly 12 moves in direction 16. This illustratively closes the jaws. Assemblies 11 and 12 also travel along guide rails 5, 6, and 7 between end cap assemblies 9, 10 and center plate assembly 3. (See also FIG. 2.) It is appreciated that the rectilinear movement of the jaw assemblies 11 and 12 can be used to grip and release either the interior or exterior of a workpiece. In the illustrative embodiment, fluid ports 18 and 19 are located in end cap assembly 10 and fluid ports 58 and 60 are located in end cap assembly 9, to actuate jaw assemblies 11 and 12.

Figure 2:
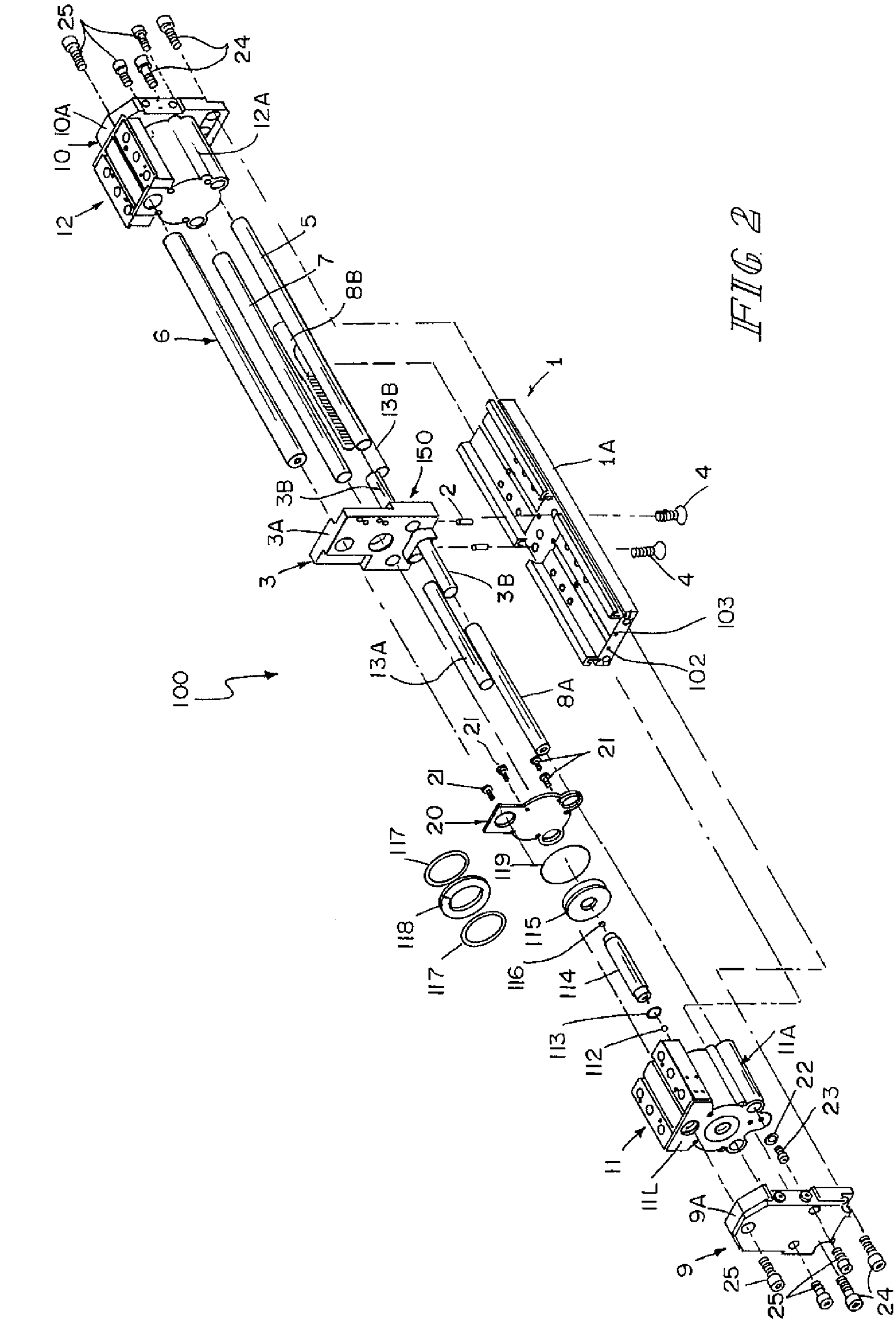
FIG. 2 is an exploded perspective view of the long travel gripper of FIG. 1.

An exploded view of gripper assembly 100 is shown in FIG. 2. This view isolates the several sub-assemblies that make up gripper 100, including; base assembly 1, center plate assembly 3, end cap assemblies 9 and 10, and jaw assemblies 11 and 12. Illustrative fasteners 4 are disposed through plate 1A and into center plate 3A to attach the same to base plate 1A. (See also FIGS. 3-4.) Alignment pins 2 extend into both base member 1A and center plate 3A for proper positioning of the same. Guide shafts 5, 6 and 7 are disposed through bores in center plate 3A and each attach to the end plates 9A and 10A via fasteners 25. (See also FIG. 10.) Guide shafts 5, 6 and 7 are each also disposed through jaw arms 11A and 12A, as shown further herein. In one illustrative embodiment, a synchronizing assembly 150 is provided illustratively comprising two racks 8A, 8B, each disposed through sleeves 13A and 13B, respectively, which are disposed through collars 3B attached to center plate 3A. Sleeves 13A and 13B are each attached at the ends to corresponding jaw arms 11A and 11B, respectively, via fasteners 23. (See also, FIG. 9.) A spacer 22 is also illustratively disposed thereon to accommodate a tolerance between structures.

Also shown in FIG. 2 is piston 115 and piston rod 114 that can be attached, illustratively, via a threaded end to a mating thread in piston 115. (See FIG. 17*b*.) O-ring 116 seals interface between piston rod 114 and piston 115. (See, also, FIG. 17*b*.) Piston rod 114 extends from jaw member 11A and is illustratively attached to end plate 9A. (See, also, FIG. 13.) In the illustrative embodiment, O-rings 112 and 113 encompass the circumference of a portion of piston rod 114. Piston 115 is bordered at its periphery by support ring 118 which also extends from the piston 115 to allow a tolerance to exist between itself and chamber 54. (See, also, FIG. 16.) This also allows piston 115 to become a floating piston. Illustratively, piston seals 117 border support ring 118 to ensure a seal between the two halves (54A and B) of chamber 54 of jaw member 11A. (See, also, FIGS. 12*a* and *b*.) A cover 20 is positioned on the jaw member 11A illustratively opposite cap 11L and attached via fasteners 21. With the assistance of an O-ring 119, cover 20 serves to seal the end of the chamber within member 11A from the outside environment.

Figure 3:
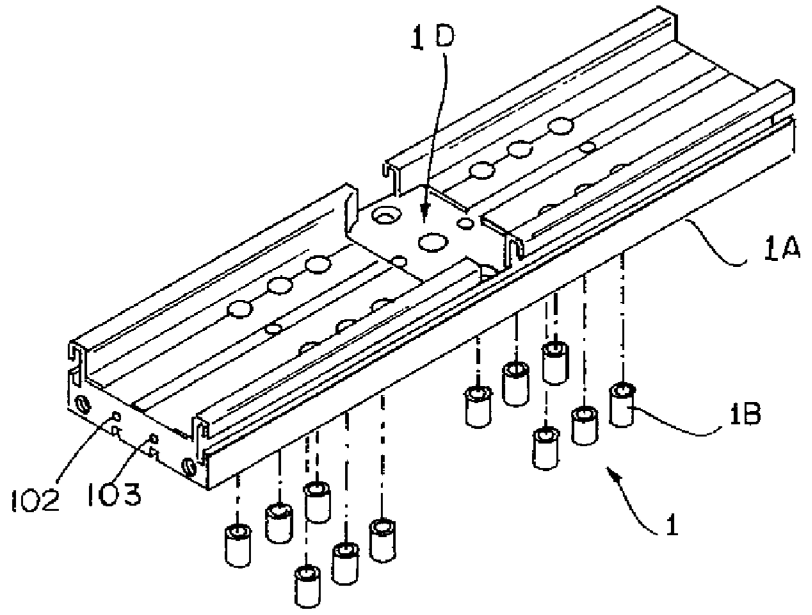
FIG. 3 is a perspective view of a base assembly portion of the gripper of FIG. 1.

A perspective view of base assembly 1 is shown in FIG. 3. In this illustrative embodiment assembly 1 comprises a base plate 1A along with threaded inserts 1B. These inserts may illustratively be fabricated from stronger and harder material than that of the base to distribute the force applied to the base which may reduce the localized stresses within the base material. Typically, the use of several inserts, such as those shown in FIG. 3, distributes the force caused by a mounting fastener over a relatively large load bearing area. Inserts 1B may illustratively be manufactured with a common external thread with same or differing internal threads (such as metric and imperial thread forms). Inserts 1B may also provide a quick and economical method of changing the threads of the base for use with various sizes and thread forms of mounting fasteners. A portion of center plate assembly 3 is received by plate 1A at 1D which, in conjunction with alignment pins 2, ensures desired alignment. This view also shows fluid passages 102, 103 that illustratively extend the length of the base 1A so fluid can be passed between end caps 9A, 10A. (See, also, FIG. 35*a*.)

Figure 4:
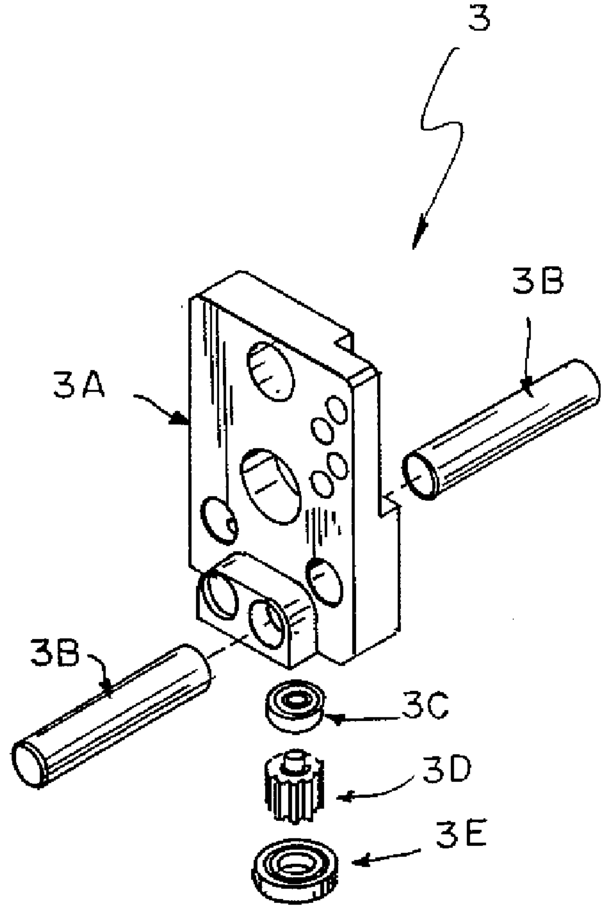
FIG. 4 is a perspective exploded view of a center plate assembly portion of the gripper of FIG. 1.

A perspective exploded view of center plate assembly 3 is shown in FIG. 4. Center plate assembly 3 illustratively comprises center plate 3A with short rack cover collars 3B extending therefrom. Upper pinion bearing 3C and lower pinion bearing 3E illustratively sandwich pinion 3D, allowing it to rotate therebetween.

Figure 5:
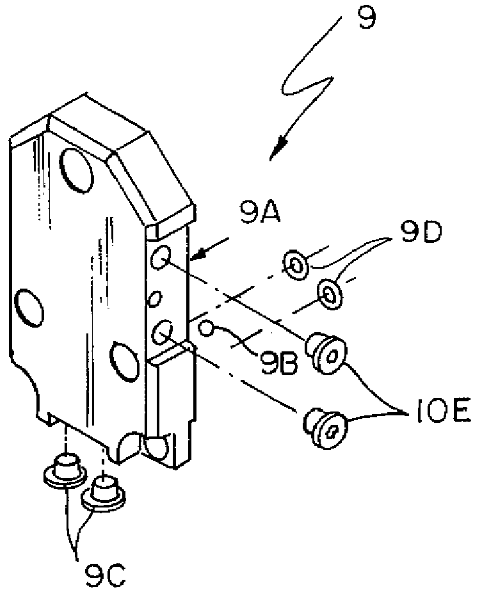
FIGS. 5 and 6 are perspective exploded views of end cap assembly portions of the gripper of FIG. 1.
Figure 6:
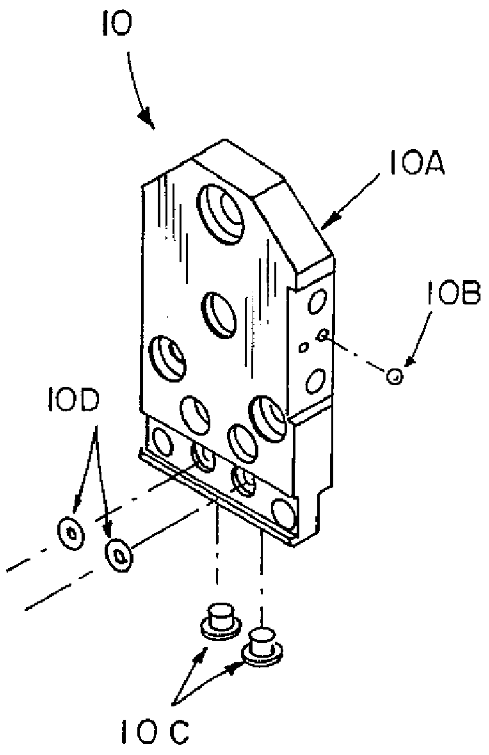

First and second end cap assemblies 9 and 10 are shown in FIGS. 5 and 6, respectively. Assembly 9 comprises end cap 9A which comprises a ball plug 9B to cap internal bores as desired. End cap assembly 9 also comprises port plugs 9C and O-rings 9D. The O-rings provide a seal between end cap 9A and the fluid passages 102, 103 in base plate 1A. End cap assembly 10 also comprises an end cap 10A and ball plug 10B along with port plugs 10C, as illustratively shown, with O-rings 10D in FIG. 6.

Figure 7:
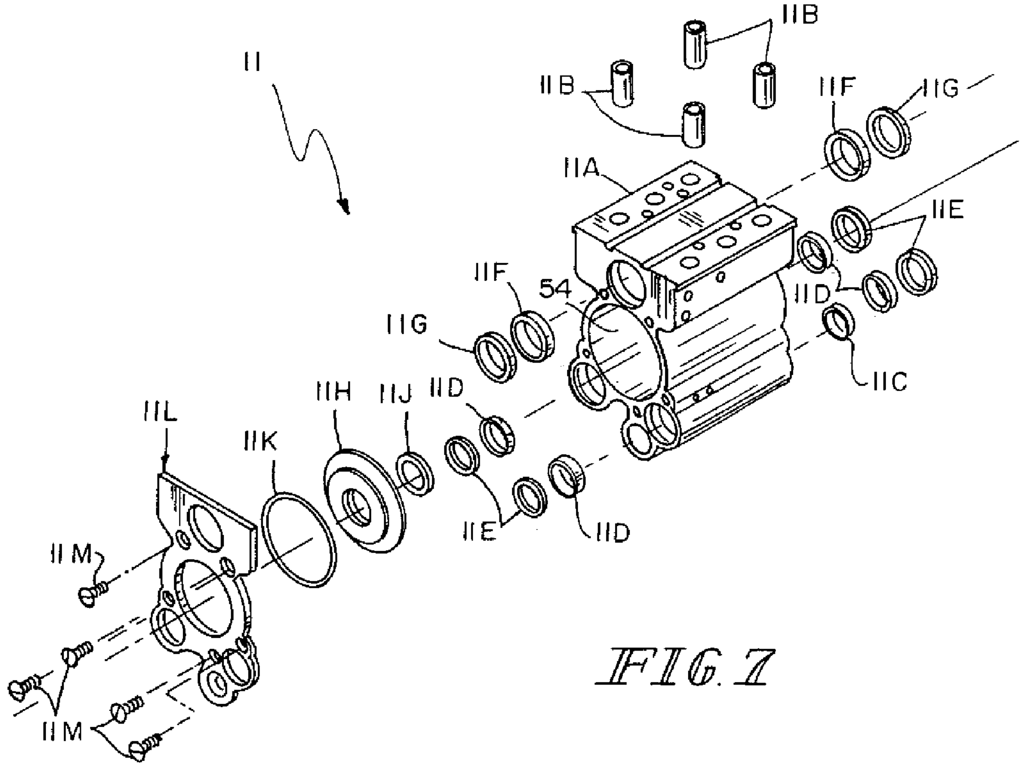
FIG. 7 is an exploded perspective view of a jaw arm assembly.

An exploded perspective view of jaw arm assembly 11 is shown in FIG. 7. Jaw arm assembly 11 illustratively comprises a jaw 11A with illustrative threaded inserts 11B disposed in bores on the top surface. An additional arm or other gripping attachment can be configured to attach to these inserts 11B. Rack cover wear rings 11C are disposed in the bore to accommodate short rack cover tube 3B, to align sleeves 13A and B, and to minimize contaminant entry. Lubrication bores and wicks can be illustratively located at each end of the jaw to maintain desired lubrication between contacting surfaces. For example, lubrication wicks 11D and 11F are used to lubricate the shaft surfaces of guide rails 5, 6 and 7 for better movement of jaw members 11A. Illustratively, wipers can be positioned about the guides and piston rods to prevent contaminants from migrating into the assembly. Shaft wipers 11E and 11G wipe guide rails 5, 6 and 7 during movement of jaw member 11A. These wipers may also assist forming a seal about the guide rails.

Rod seal retainer 11H illustratively caps chamber 54 located within jaw 11A, and comprises a bore itself to accommodate piston rod 114. Rod wiper seal 11J and O-ring 11K seal chamber 54. An end cover 11L illustratively caps the various wicks, wipers, retainers, and jaw member 11A. End cover 11L illustratively fastens to jaw 11A via fasteners 11M. It is appreciated that in an illustrative embodiment, jaw assembly 12 comprises corresponding structures as those discussed with respect to assembly 11.

Figure 9:
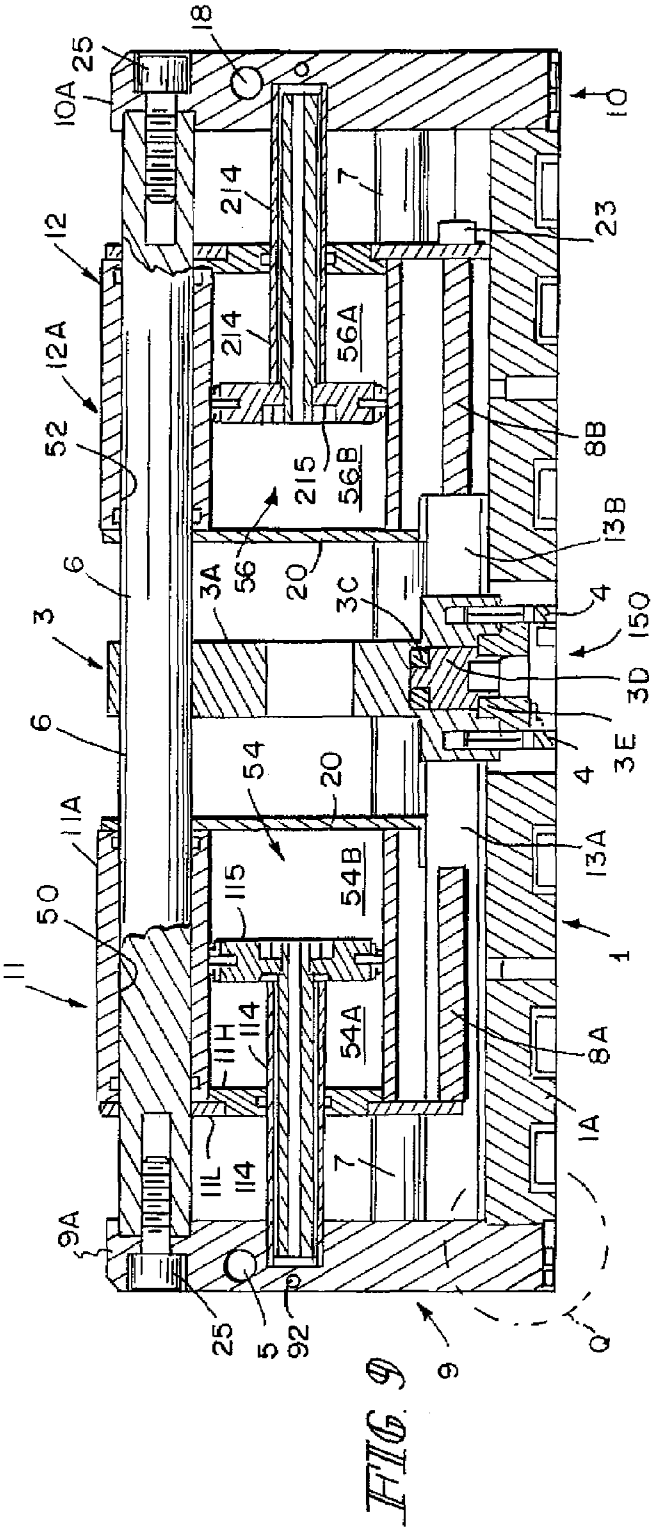
FIG. 9 is a side-elevation perspective view of the gripper of FIG. 8 taken along lines H-H of the same.
Figure 8:
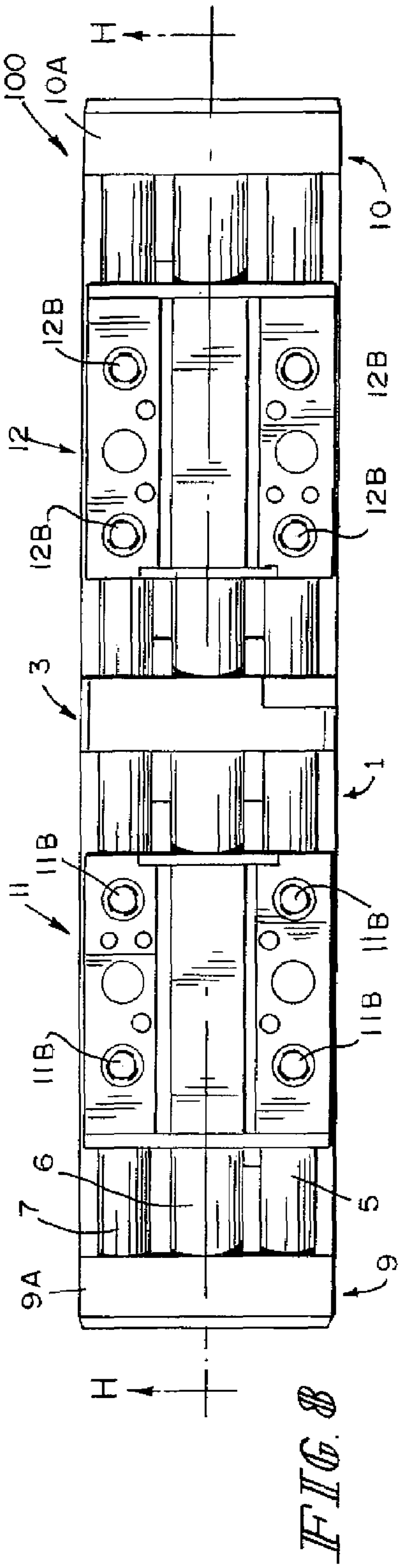
FIG. 8 is a top view of an illustrative embodiment of a long travel gripper.

A perspective view of long travel gripper assembly 100 is shown in FIGS. 8 and 9. Specifically with respect to FIG. 8, the primary assemblies shown include base assembly 1, cap assemblies 9 and 10, center plate assembly 3, and jaw assemblies 11 and 12. This view also shows an illustrative layout of inserts 11B and 12B configured to receive arm or jaw attachments to hold a workpiece. It is appreciated, however, that this layout for inserts 11B and 12B is illustrative only and is contemplated to be modifiable to receive any variety of gripping structures.

The side cross-sectional view of gripper assembly 100, taken along lines H-H of FIG. 8, is shown in FIG. 9. This view further discloses the interior structures of the assembly. For example, guide rails 6 and 7 are shown extending from end cap 9A to end cap 10A with fasteners 25 holding the structures together. Also shown is how guide rail 6 is disposed through bores 50 and 52 formed in jaws 11A and 12A, respectively. Also formed in jaws 11A and 12A are cavities 54 and 56, respectively. These cavities are configured to receive piston rods 114 and 214 respectively, as well as pistons 115 and 215 respectively. Synchronizing assembly 150 is also shown which includes racks 8A and 8B disposed in sleeves 13A and B, respectively, to engage pinion 3D.

Figure 10:
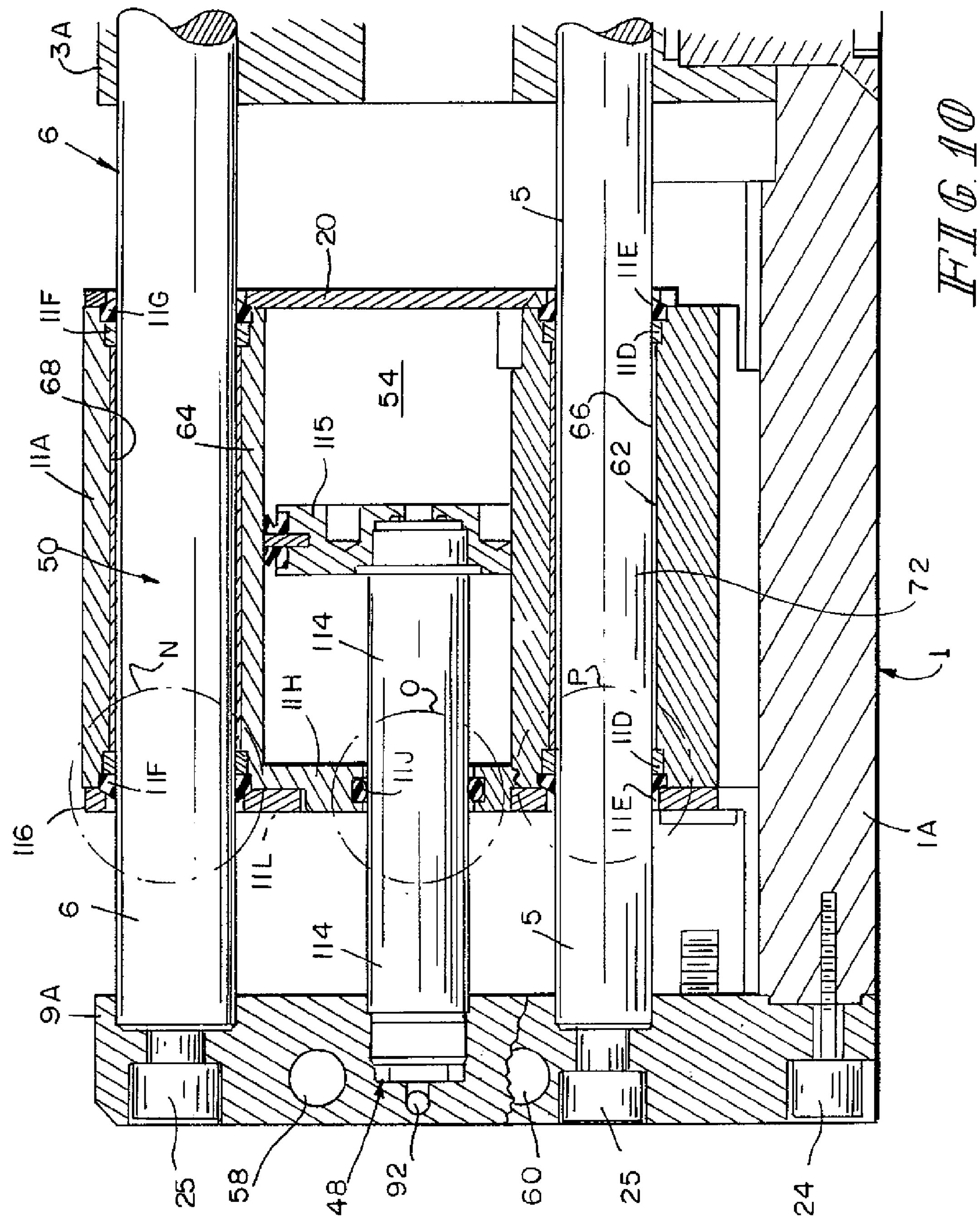
FIG. 10 is a side-elevation perspective view of a portion of the long travel gripper.

A side elevation perspective view of a portion of long travel gripper 100 is shown in FIG. 10. In particular, this view shows the interaction between jaw 11A and rails 5 and 6, as well as piston rod 114 and piston 115. In addition, rails 5 and 6 are shown attached to end cap 9A via fasteners 25. Furthermore, base 1A is attached to end cap 9A via fastener 24, as shown. And, finally, piston rod 114 is coupled to end cap 9A via bore 48. Bore 48 is in fluid communication with fluid passage 60 to assist supplying fluid to chamber 54. (See, also, FIG. 14.) It is appreciated that these descriptions of structure and operation with respect to jaw 11A apply to jaw 12A as well.

Because in this illustrative embodiment jaw 11A can be formed via an extrusion process, rod seal retainer 11H and covers 11L and 20 assist sealing the jaw arm from the exterior environment. Assistance is also provided by wipers 11E and 11G. Bearing material, such as a fluorocarbon composite bearing 62, can be applied on the surface wall 66 and 68, respectively, of the guide rail bores 50 and 72. It is appreciated that the same associated structures on jaw 11A applied to guide rails 5 and 6 also apply to guide rail 7 which is not shown in this view.

Figure 11A:
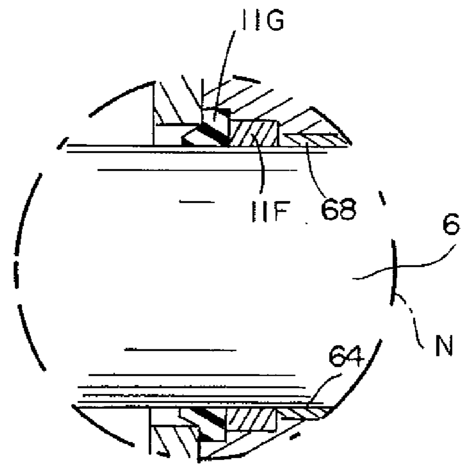
FIGS. 11*a, b*, and *c* are detail views taken from portions N, O, P, respectively, from FIG. 10.
Figure 11B:
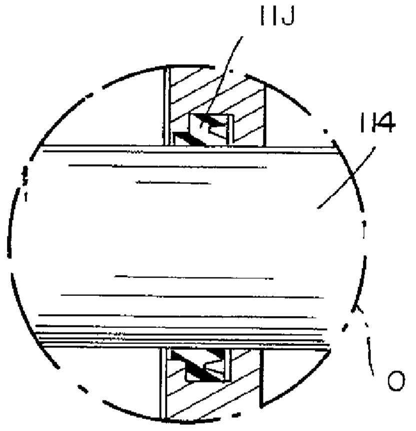
Figure 11C:
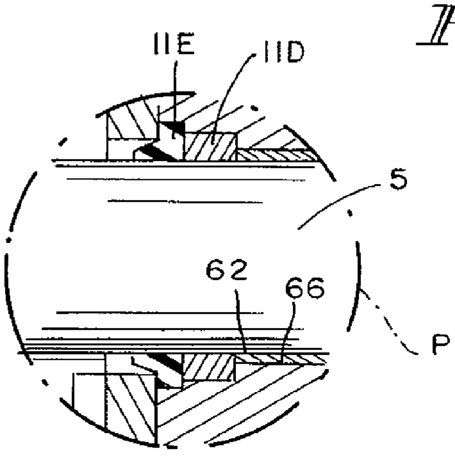

Detail views taken from portions N, O, P of FIG. 10 are shown in FIGS. 11*a-c*, respectively. Each of these views show how the wipers 11E, G, and J interact and seal guide rails 5, 6 and piston rod 114, respectively. These views also show the relative positioning of lubrication wicks 11D and F. Furthermore, in this illustrative embodiment, bearings 62 and 64 applied to surfaces 66 and 68, respectively, are shown engaging guide rails 5 and 6. It is, again, appreciated that the structures shown in FIGS. 11*a* and *c* involving guide rails 5 and 6, respectively, apply to guide rail 7, as well.

Figure 12A:
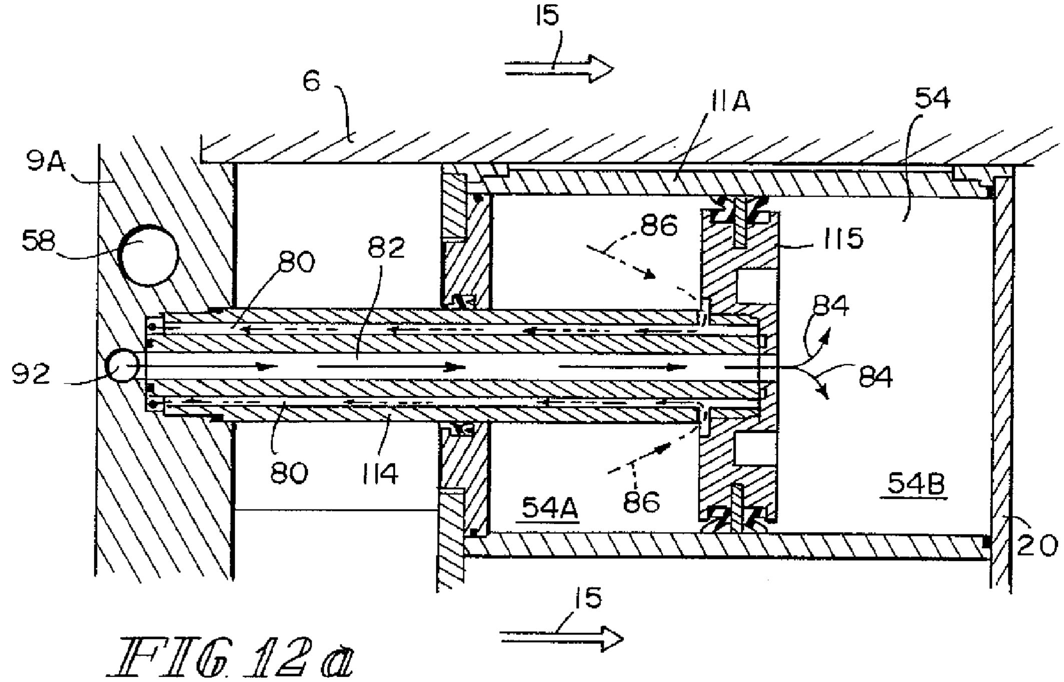
FIGS. 12*a* and *b* are side-elevation cross-sectional views of another portion of the long travel gripper.

Side elevation cross-sectional views of the piston rod assembly in jaw 11A are shown in FIGS. 12*a* and *b*. The distinction between the views of 12*a* and *b* is that the fluid direction in FIG. 12A causes jaw 11A to travel in direction 15 towards an illustrative closed position, whereas the fluid flow in FIG. 12*b* causes jaw 11A to move in direction 14 towards an illustrative open position. In this illustrative embodiment, parallel passages 80 and 82 are disposed in piston rod 114. It is appreciated that piston rod 114 and its associated passages 80 and 82 can be formed via extruding the same. Because piston 115 is fixed to piston rod 114, the increased air pressure forces the jaw to move. As shown in FIG. 12*a*, specifically, fluid that is provided through passage 82 enters chamber portion 54B of chamber 54, filling portion 54B. This fluid flow is indicated by reference numeral 84. Any fluid present on the opposite side of piston 115 in chamber portion 54A is exhausted through passages 80, as indicated by reference numeral 86. This fluid is allowed to exhaust so as not to cause excessive resistance pressure against piston 115. As fluid is being dispensed into chamber portion 54B, the additional space required to accommodate that fluid causes jaw 11A to travel in direction 15.

Conversely, when fluid is provided through passages 80, it deposits into chamber portion 54A. This fluid flow is indicated by reference numeral 87. Also conversely, during this step, fluid that may exist in chamber portion 54B, indicated by reference numeral 89, will be allowed to exhaust through passage 82. As more fluid is being added to chamber portion 54A, the expansion required to accommodate the fluid causes jaw 11A to travel in direction 14 as shown.

Figure 12B:
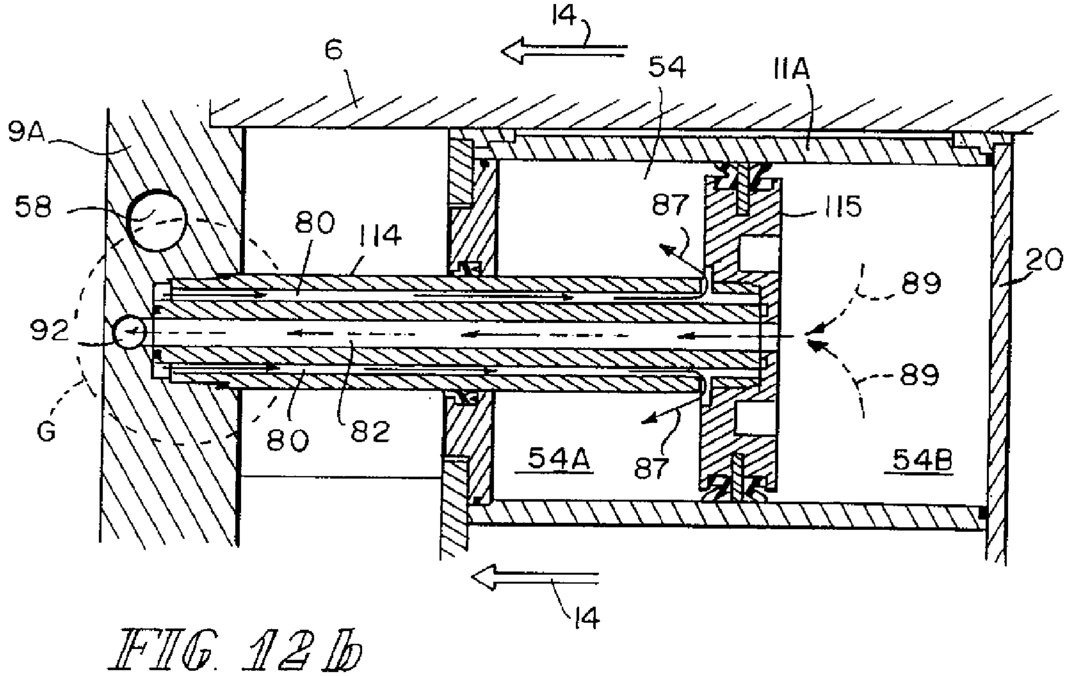
Figure 13:
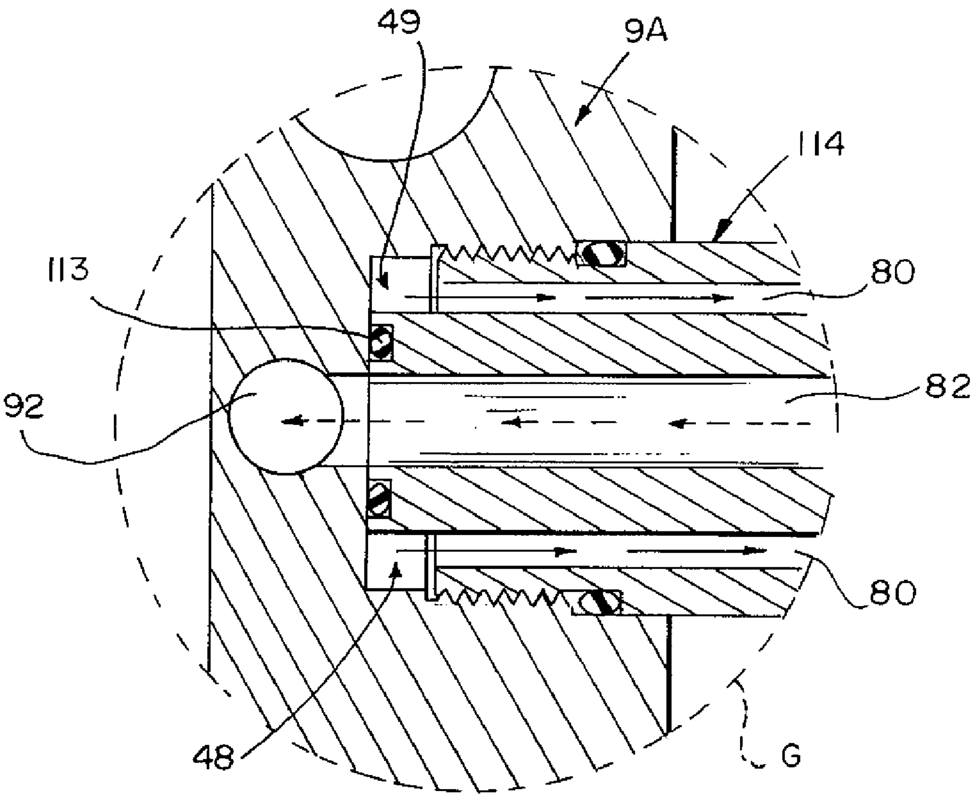
FIG. 13 is a detail view taken from section G of FIG. 12*b;*

A detail view taken from section G of FIG. 12*b* is shown in FIG. 13. This view shows the interaction between piston rod 114 and end cap 9A. In this illustrative embodiment fluid passages 80 are in communication with an annulus 49 disposed in bore 48. In contrast, inner passage 82 is in fluid communication with bore 92 also in end cap 9A. A seal 113 prevents fluid communication between the passages 80 and 82 at bores 48 and 92.

Figure 14:
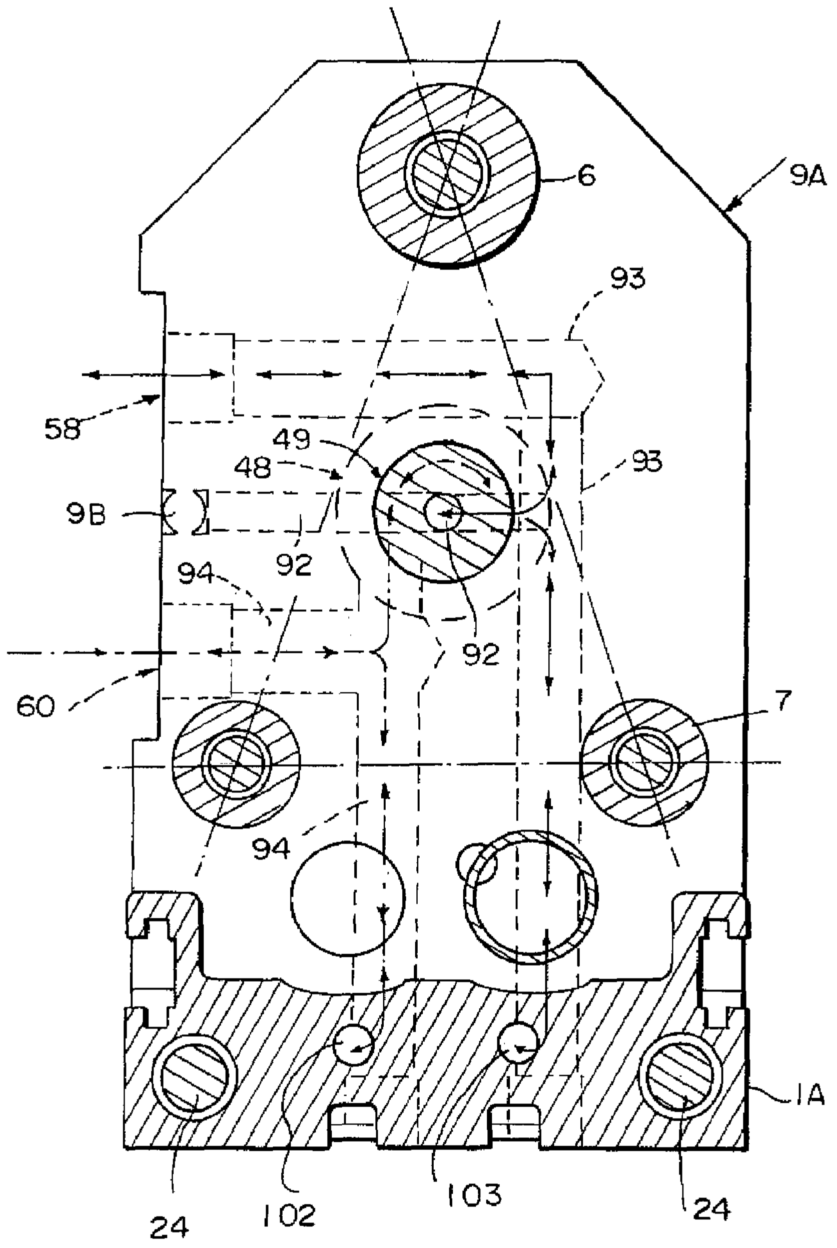
FIG. 14 is an end, partial phantom, and cross-sectional view of an end cap and base.

An end, partial phantom, and partial cross-sectional view of end cap 9A is shown in FIG. 14. This view shows how fluid can be provided to bore 92 and annulus 49 for fluid communication into passages 80 and 82 of piston rod 114. In this illustrative embodiment, fluid can be supplied through port 58 to connecting passage 93. This passage 93 is also in fluid communication with bore 92 for supplying fluid into passage 82 of piston rod 114. (See FIG. 12*a*.) In addition, passage 93 is in fluid communication with fluid passage 103 of base member 1A. It is appreciated that fluid supplied from port 58 can pass through fluid passage 103 and into a corresponding passage in end cap 10A similar to passage 93. In that instance, the fluid is then directed through a corresponding bore which directs the fluid into piston rod 214 as previously described with respect to fluid passage 82. The result is allowing one fluid port, such as port 58, to actuate both jaws 11A and 12A. In this embodiment, fluid being directed into passage 82 will deposit in chamber portion 54B causing jaw member 11A to move in direction 15 as shown in FIG. 12A. Similarly, jaw 12A will be caused to move in direction 16 for the same reasons. Concurrent movement of these jaws in directions 15 and 16, respectively, close the jaws.

Conversely, fluid can be supplied through port 60 on end cap 9A and passage 94. Fluid can then be supplied to annulus 49 of bore 48 as illustratively shown. Passage 94 is also in fluid communication with fluid passage 102 also disposed through base member 1A. Fluid passing through passage 102 is directed through a corresponding passage in end cap 10A, similar to the passage 94 in end cap 9A. This fluid is then directed into a bore that is analogous to bore 48 of end cap 9A. The fluid can then be directed into passages in piston rod 214. The result is that fluid provided from a single source and directed to both piston rods 114 and 214 cause jaws 11A and 12A, respectively, to move in directions 14 and 17, respectively, to an illustrative open position. (See also FIG. 12*b*.) An illustrative diagram of such fluid movement is also depicted in FIGS. 36*a* and *b*.

This view also best shows the arrangement of jaw guides 5, 6, 7 with respect to each other. As shown, the arrangement of these jaw guides 5, 6, 7 is in a triangular-shape with acute angles formed between adjacent jaw guides. Also shown is the position of piston rod 114 which is located at about the center of torsion (or center of twist) with respect to jaw guides 5, 6, 7. The center of torsion is illustratively an axis essentially parallel to the longitudinal axes of jaw guides 5, 6, 7 about which the guides mutually rotate when collectively exposed to an applied torque. Placement of the longitudinal centerline of the piston rod coincident with the center of torsion ensures that twisting of the jaws, as might occur as gripper assembly 100 lifts an object, only acts to rotate them about the centerline of the piston rod. Application of deleterious lateral forces against the rod, piston, seals, and supporting ring may, therefore, be reduced. Typically, such lateral forces may contribute to distortion and subsequent leakage of the piston seals. It is appreciated that piston rod 214 can be positioned at the center of torsion with respect to jaw guides 5, 6, 7 on end cap 10A. (See, also, FIG. 22.)

Figure 15:
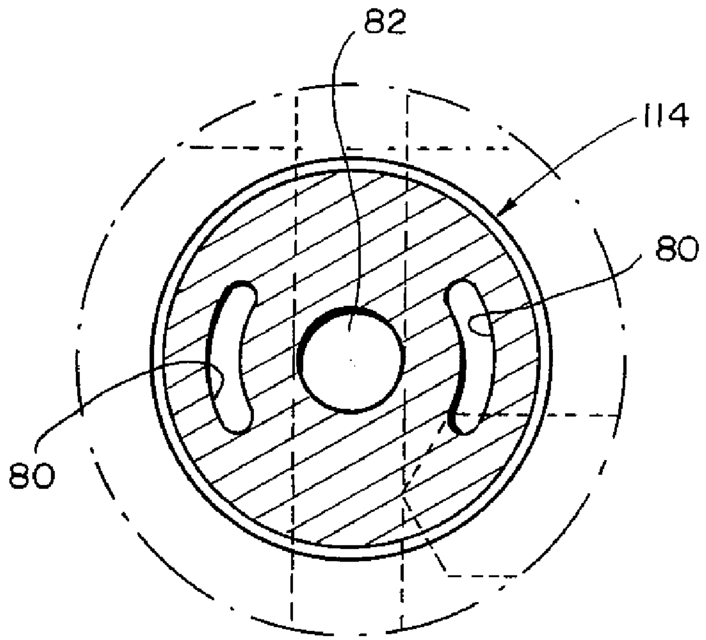
FIG. 15 is an end view of an illustrative embodiment of a dual air supply piston rod having parallel fluid passages.

An end view of piston rod 114 is shown in FIG. 15. This view depicts the relative positioning of parallel passages 80 and 82. It is also appreciated from this view that piston rod 114 and its parallel passages 80 and 82 can be formed via extrusion process, rather than being formed by either machining a rod or assembling multiple rods to form the passages. (See, also, FIGS. 27 and 28.)

Figure 16:
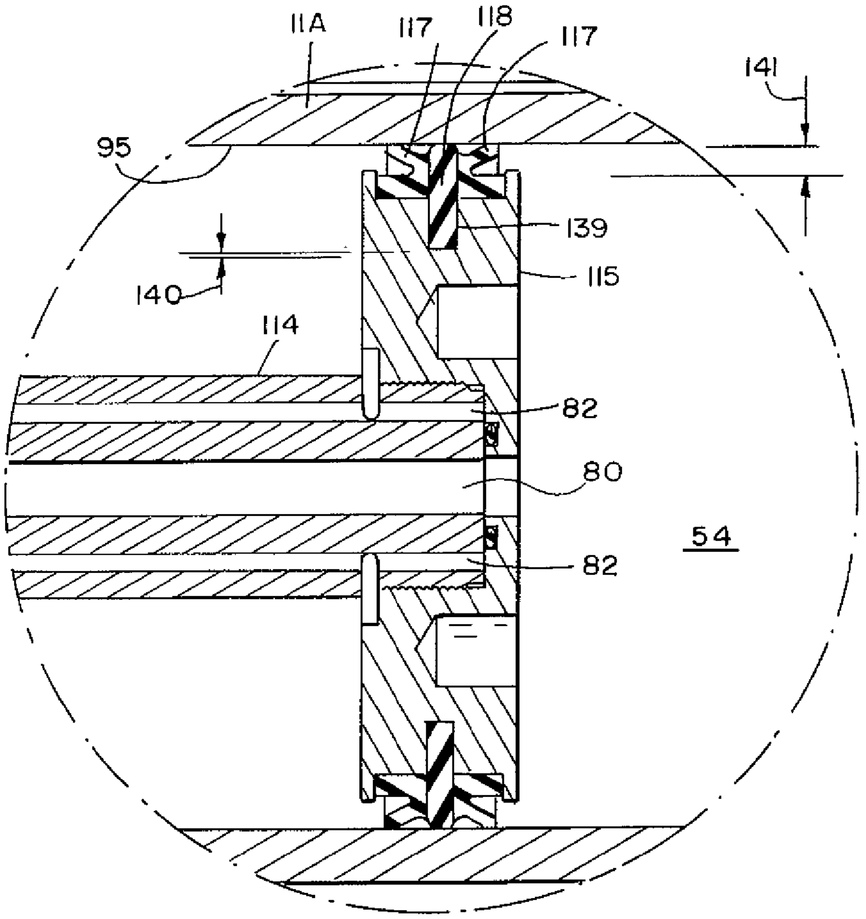
FIG. 16 is a detail view of a portion of the piston and piston rod assembly of the long travel gripper.

A detailed view of a portion of piston rod 114 and piston 115 is shown in FIG. 16. Specifically, this view shows the interaction between seals 117 that are spaced apart from each other and disposed about the periphery of piston 115 and wall 95 of chamber 54. It is appreciated, however, that these structures discussed herein related to jaw 11A can also be applied to jaw 12A. In this illustrative embodiment a wear or supporting ring 118 is positioned between the seals 117 and is disposed into channel 139. In one illustrative embodiment a gap

140 may be formed between supporting ring 118 and piston 115 in channel 139. Another gap 141 can exist between wall 95 and piston 115. The piston 115 and supporting ring 118 can, thus, be "floating" to decrease side load stresses on the piston rod 114. Ring 118 may also provide backup support for seals 117. Another illustrative embodiment may incorporate lip seals for compliance in the bore and replace a rigid piston with a compression seal.

Figure 17B:
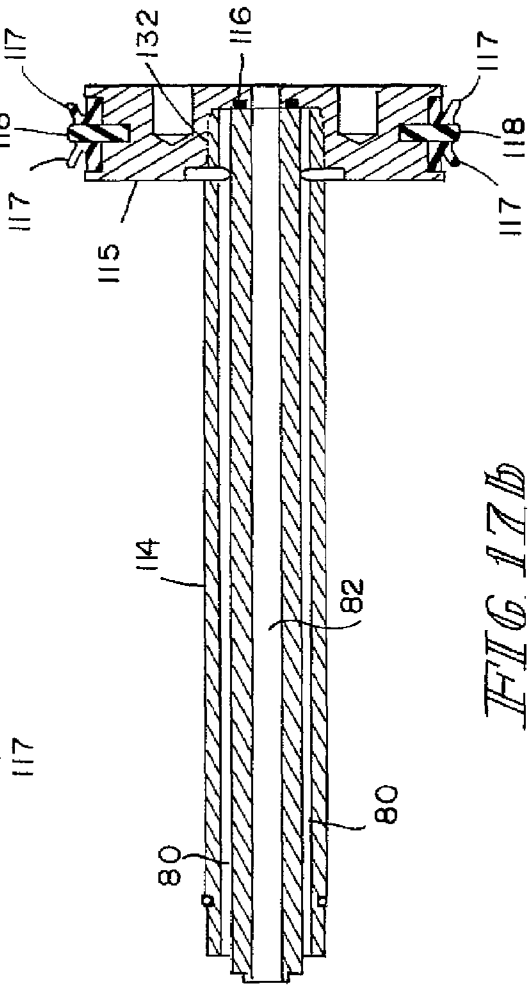
FIGS. 17*a* and *b* are perspective and side cross-sectional views of an illustrative embodiment of a piston and piston rod assembly.
Figure 17A:
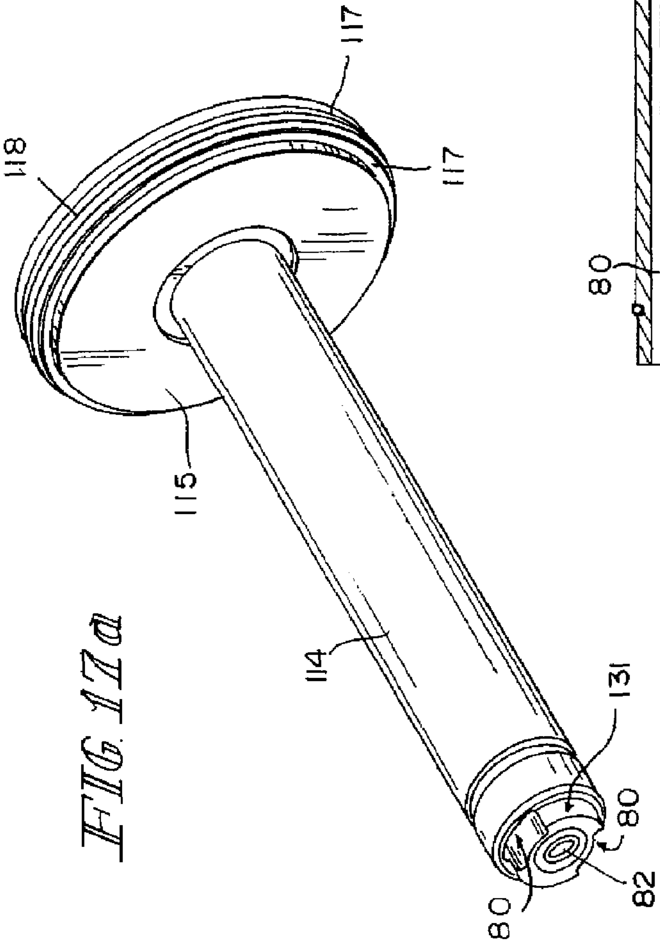

Perspective and cross-sectional views of piston rod 114 and piston 115 are shown in FIG. 17*a* and *b*. FIG. 17*a* specifically shows how seals 117 and support ring 118 are positioned about the periphery of piston 115. Also shown in this view is how the terminus of piston rod 114 includes an illustrative extension 131 that segregates the openings of parallel passages 80 from parallel passage 82. Shown in FIG. 17*b* is the illustrative attachment between piston rod 114 and piston 115. In this illustrative embodiment, piston rod 114 comprises threaded end 132 that engages corresponding threads in piston 115. A seal 116 can be placed between the piston rod 114 and piston 115 to help prevent any fluid leaking there between. It is appreciated that piston rod 214 and piston 215 may include the same afore-described structures.

Figure 18:
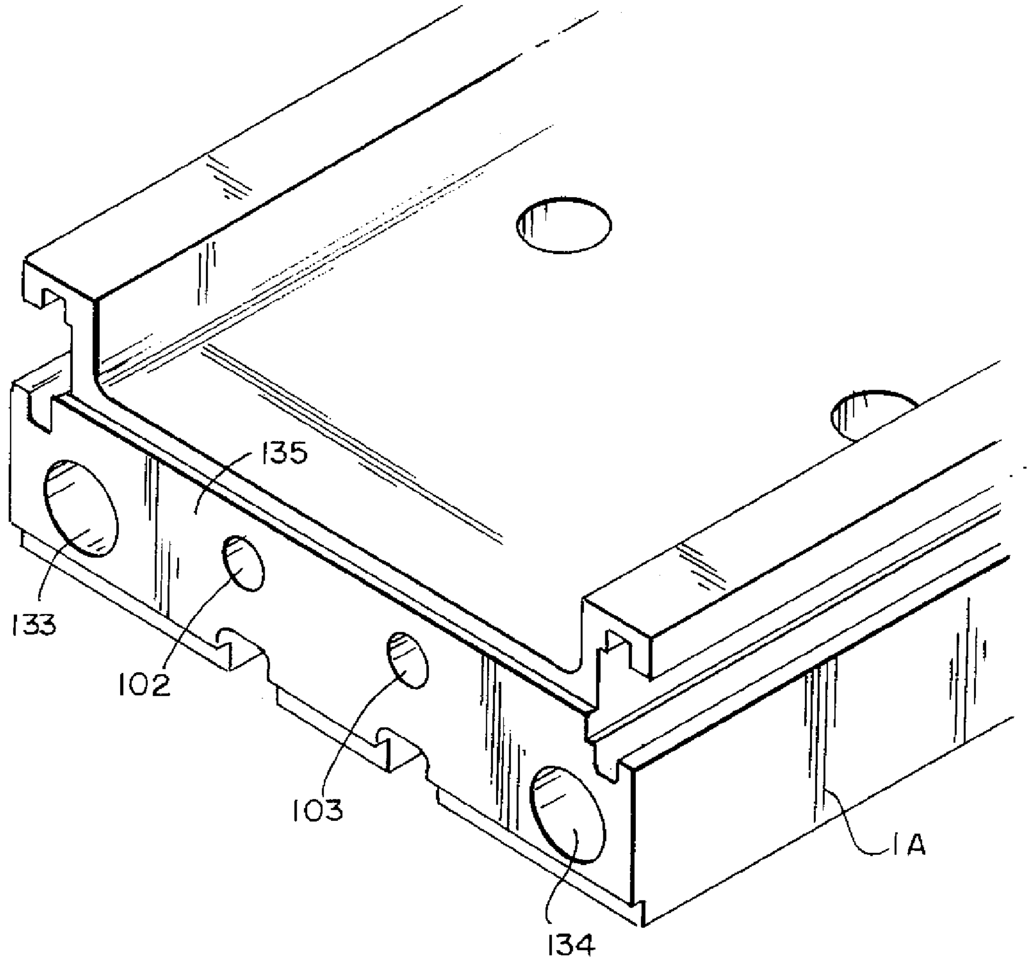
FIG. 18 is a perspective view of a portion of a base member.
Figure 19:
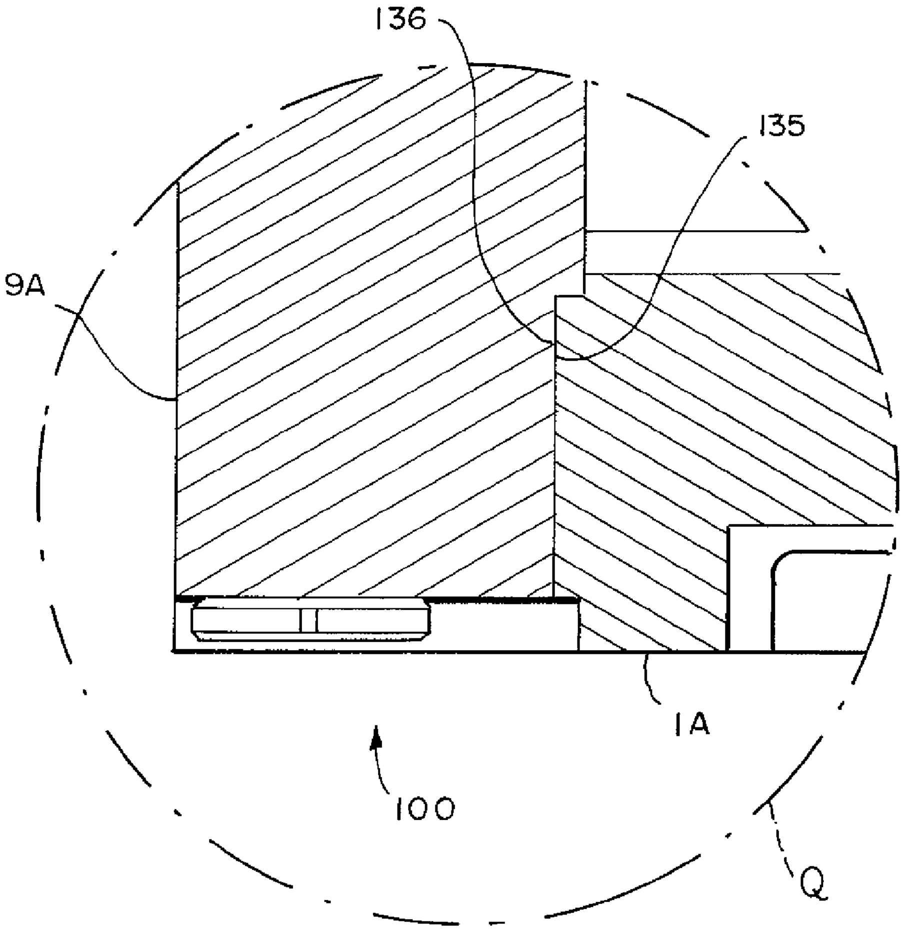
FIG. 19 is a detail view of a portion of a base member coupled to an end cap taken from detail section Q of FIG. 9.

A perspective view and a detail view of base member 1A is shown in FIGS. 18 and 19. As specifically shown in FIG. 18, base member 1A illustratively comprises fluid passages 102 and 103, as previously discussed. In addition, bores 133 and 134 can be configured with threaded side walls to receive fasteners 24 which attach end plate 9A (as well as end plate 10A on the opposing side of base assembly 1A) to base member 1A. (See also FIGS. 2 and 10.) Also shown in FIG. 18 is a protrusion or key 135 that extends from the terminus of base member 1A. As shown in the detail view of FIG. 19, key 135 is configured to be received in a complimentary-shaped receptacle 136 to aid in a desired mating between the base member and the end caps. It is appreciated that although end cap 9A is shown in FIG. 19, such a key and receptacle can be provided on and between base member 1A and end cap 10A for desired mating between those structures as well.

Figure 20:
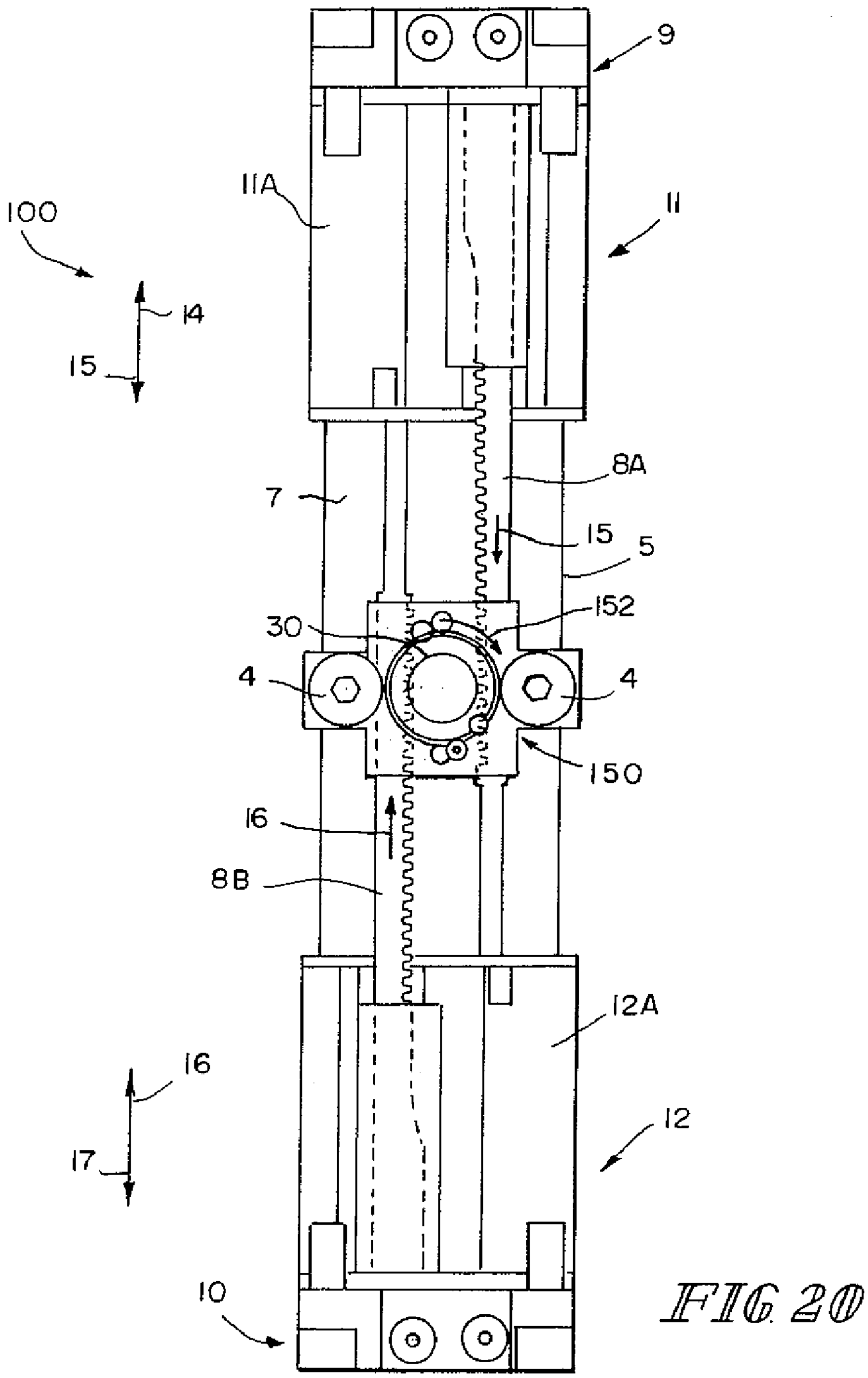
FIG. 20 is an upward looking partially phantom view of a long travel gripper assembly.
Figure 21:
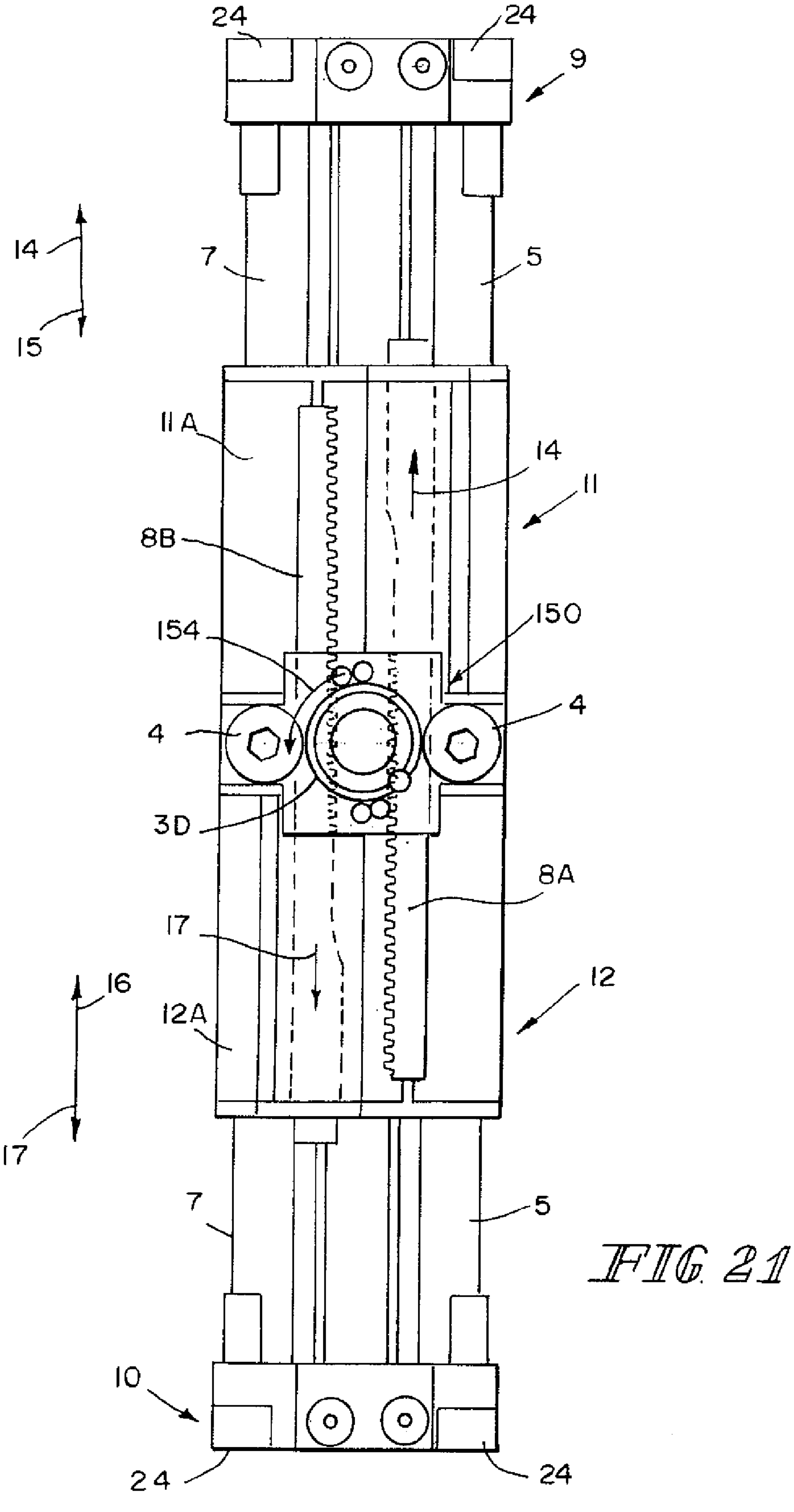
FIG. 21 is another upward looking partially-phantom view of the long travel gripper assembly.

Upward looking, partially phantom views of long travel gripper 100 are shown in FIGS. 20 and 21. In this illustrative embodiment, gripper assembly 100 may comprise a synchronizing assembly 150 that is configured to assist maintaining consistent relative positioning between jaw members 11A and 12A. Pinion 3D can be configured to engage racks 8A and B. As shown in the illustrative embodiment in FIG. 20, movement of jaw arms 11A and 12A in directions 15 and 16, respectively, toward a closed position causes pinion 3D to rotate in direction 152 as shown. Conversely, when jaw arms 11A and 12A move in directions 14 and 17, respectively, toward an open position, pinion 3D rotates in an opposite direction 154 to maintain synchronization. Synchronizer assemblies are known in the art and examples of such synchronizing assemblies that can be configured on such a long travel gripper as disclosed herein, can be found in U.S. Pat. No. 6,598,918 entitled "Synchronized Gripper Jaws," the disclosure of which is herein incorporated by reference.

Figure 22:
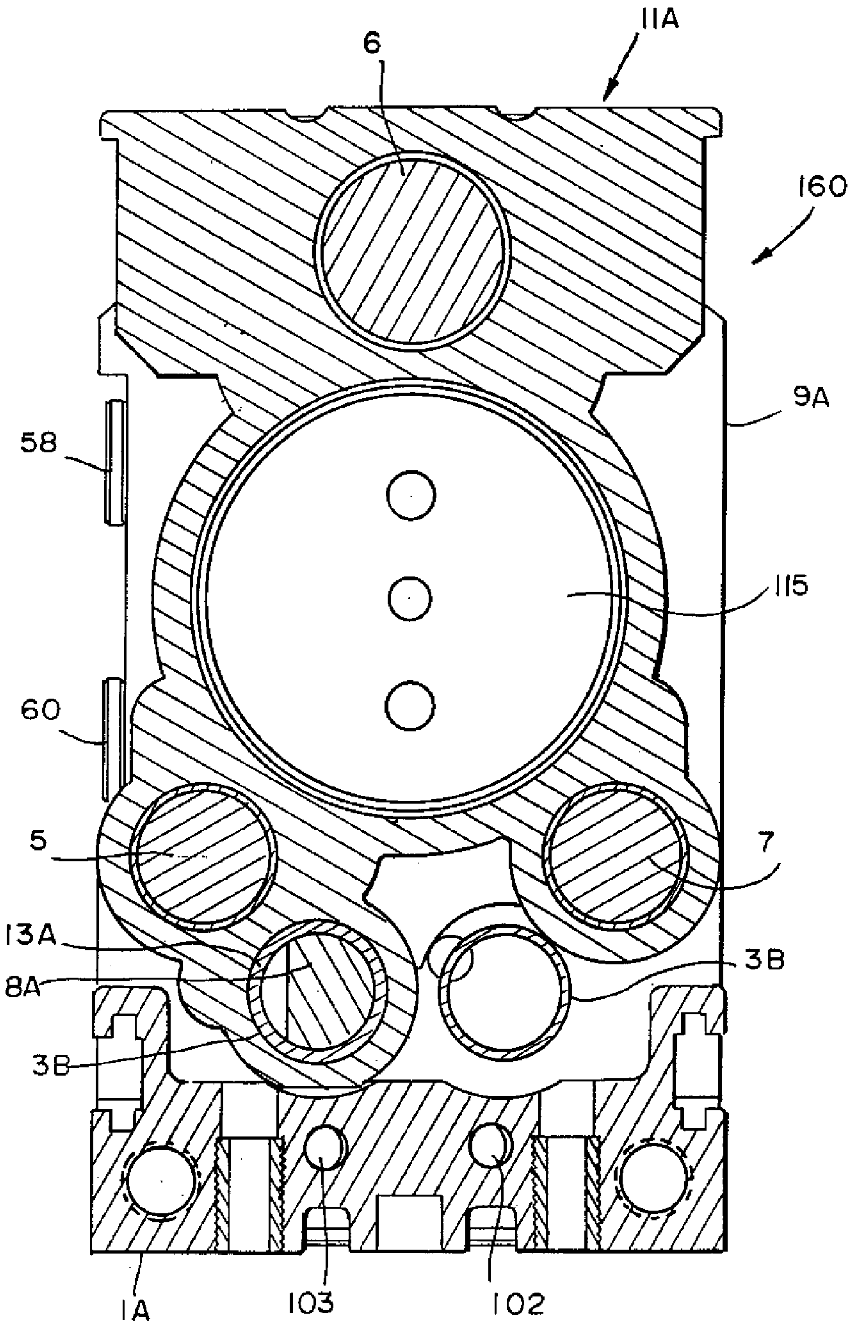
FIG. 22 is an end cross-sectional view of a portion of the long travel gripper assembly including the jaw arm and base.

An end cross-sectional view of long travel gripper assembly 100, and particularly jaw 11A, is shown in FIG. 22. This view shows the relative positioning of rack 8A with sleeve 13A and collar 3B, to jaw guides 5, 6, and 7. Also shown in this view is how jaw 11A is configured to maintain clearance from the opposing collar 3B. This view further depicts the triangular-shaped positioning of jaw arms 5, 6, 7 and the relative position of piston 115 at the center of torsion of those guides, as previously discussed.

Figure 23:
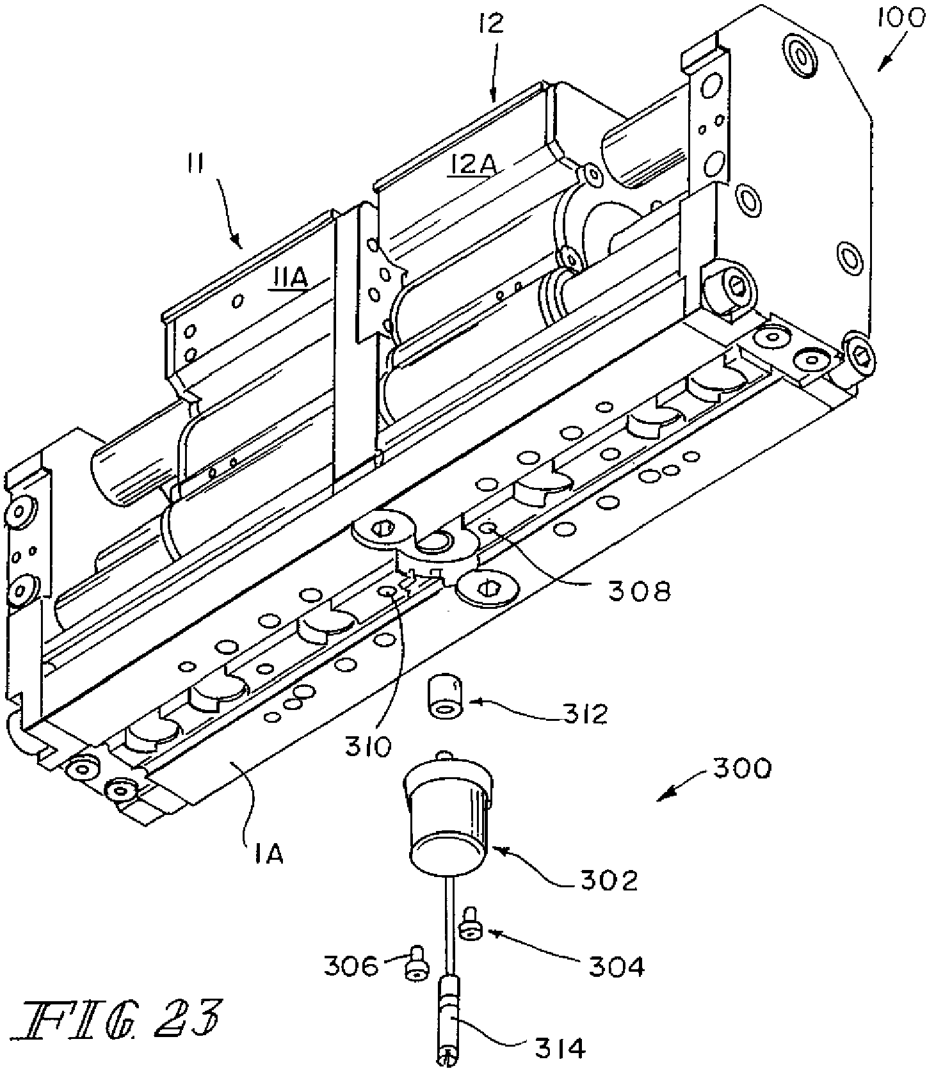
FIG. 23 is an upward looking perspective view of the long travel gripper with an exploded view of its sensor assembly.

An upward looking perspective view of long travel gripper 100 with an exploded view of an illustrative sensor assembly 300 is shown in FIG. 23. In this illustrative embodiment, the sensor assembly 300 is a continuous jaw position sensor which detects the rotation of pinion 3D in this case, and translates that information into linear positioning of the jaw arms 11A and 12A. This allows detection of the jaws at any position along their stoke on the gripper assembly. In one illustrative embodiment, as pinion 3D rotates, a resistance changer or other similar-type mechanism assists in determining a change in resistance during the rotation of pinion 3D. This change in resistance can be used to calculate the position of the jaws with respect to each other. It is further appreciated that a rotary encoder or similar device may be used in place of the resistance changer. An illustrative embodiment of such an encoder provides an output that can also be used to calculate the position of the jaws with respect to each other. As shown herein, sensor assembly 300 comprises a rotary sensor unit 302 that is attached to base member 1A via fasteners 304 and 306 which engage corresponding threaded bores 308 and 310. A coupling 312 connects the sensor unit 302 to pinion 3D. (See FIG. 24.) Illustratively, cabling 314 can be used to connect sensor unit 302 to a controller or read-out module (not shown).

Figure 24:
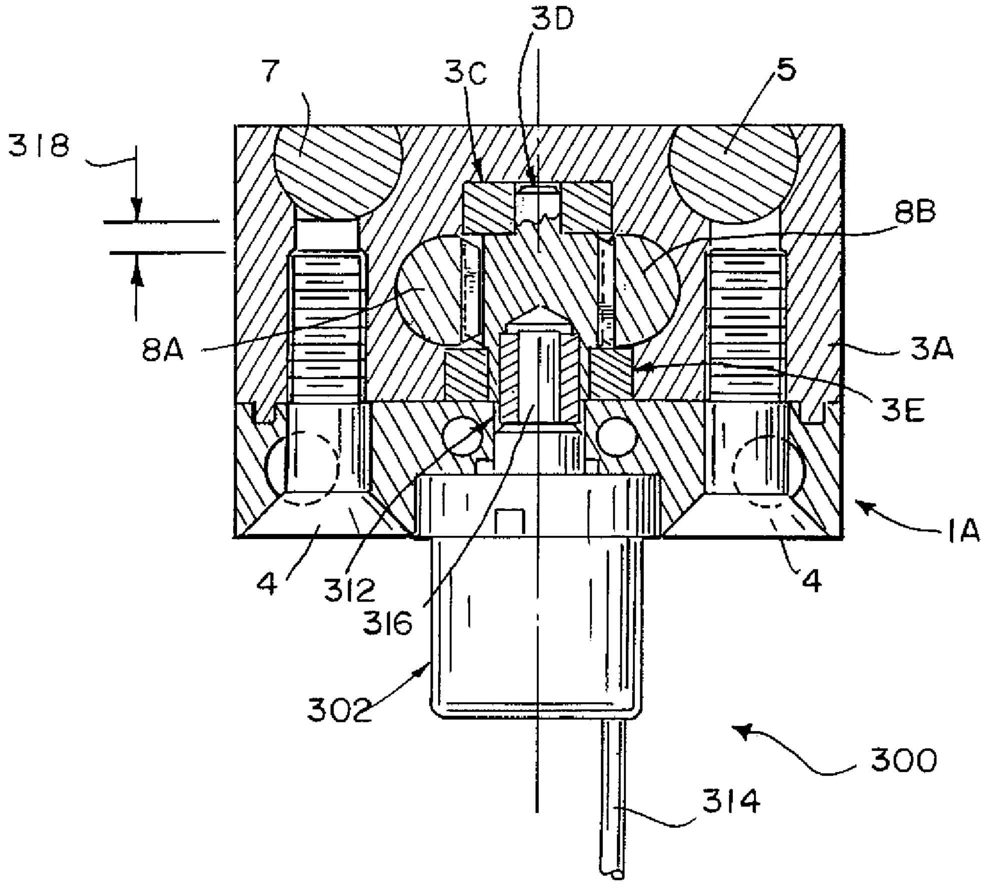
FIG. 24 is a cross-sectional view of the long travel gripper assembly with the sensor assembly coupled thereto.

A cross-sectional view of long travel gripper assembly 100 at center plate 3A, is shown in FIG. 24. This view shows illustratively, how sensor assembly 300 is coupled to pinion 3D and how base member 1A is attached to center plate 3A. Illustratively, coupling 312, which can be an elastic coupling, engages both the rotary end 316 of sensor unit 302 and pinion 3D. As can be seen in this view, as pinion 3D rotates, it engages the teeth in racks 8A and 8B. Because these racks are attached to their corresponding jaw arms 11A and 12A, respectively, one skilled in the art can easily ascertain how the rotation of pinion 3D can be used to gage the relative positioning of the jaws.

Also shown in this view are fasteners 4 which are disposed through base member 1A and extend into bores in center plate 3A to attach the same to base member 1A. In this illustrative embodiment, spacing 318 is provided between the end of fastener 4 and rails 5 and 7 to allow appropriate clearance between structures.

Figure 26:
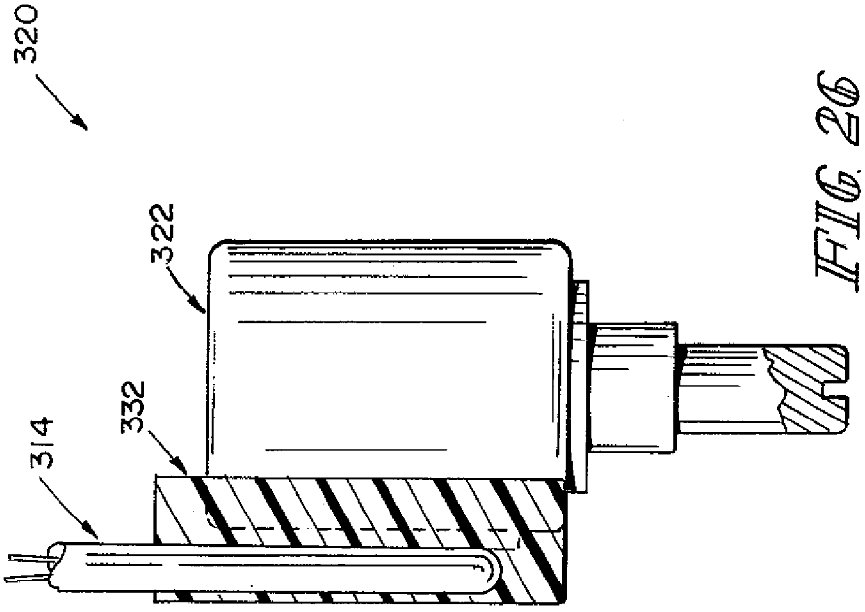
FIGS. 25 and 26 are side cross-sectional views of illustrative embodiments of a sensor assembly.
Figure 25:
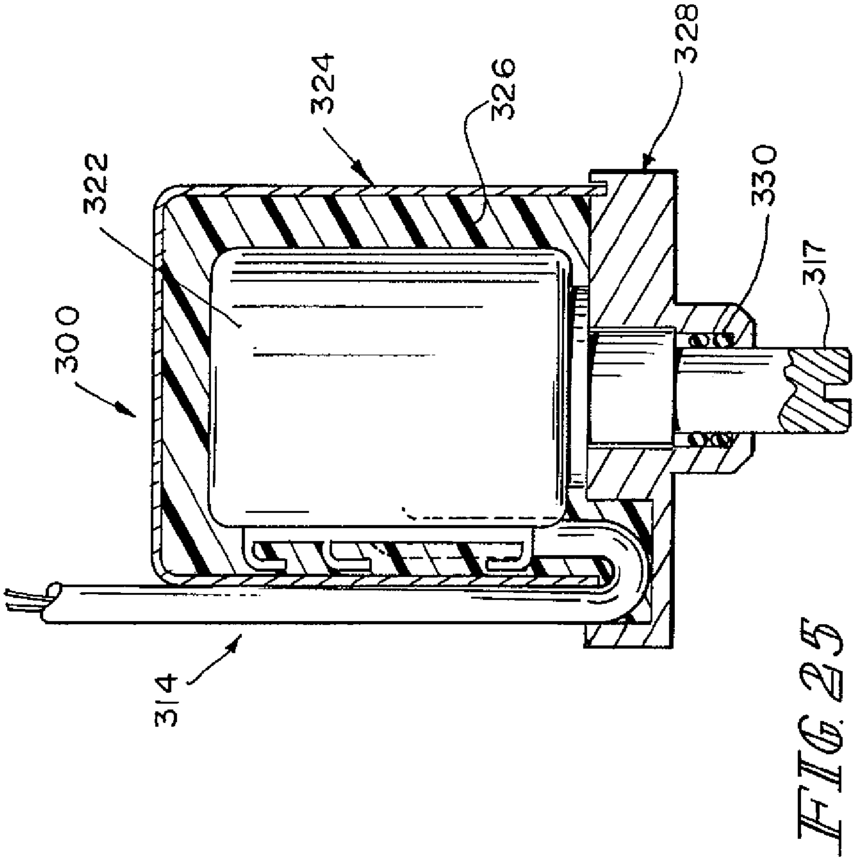

Side cross-sectional views of illustrative embodiments of sensor assemblies 300 and 320 are shown in FIGS. 25 and 26, respectively. The primary distinction between the two sensors is that sensor 300 in FIG. 25 is a sealed unit, whereas sensor 320 in FIG. 26 is a non-sealed unit. With regard to sealed unit 300, it comprises a sensor 322 and a sensor cap 324 that shrouds sensor 322 (collectively 302 as shown in FIG. 23) and a mounting 328. Potting 326 may be used to insulate sensor cap 324. In an illustrative embodiment, the potting adhesively bonds the cap to the mounting and environmentally seals the joint formed there between. This version also may comprise seals 330 located about an opening in mounting 328 and which borders rotary end 317 of sensor 322. Mounting 328 also may accommodate cable 314 that connects sensor 322 to a controller. In contrast, non-sealed sensor assembly 320, comprises sensor 322 and potting 332 that is positioned around cable 314. The sealed unit 300 is protected from the ingress of fluids or debris that might damage or disrupt the function of the sensor. As such, it is better suited to harsh operating environments. The non-sealed unit 320 is less expensive to manufacture and can be used in non-deleterious operating environments.

Figure 28:
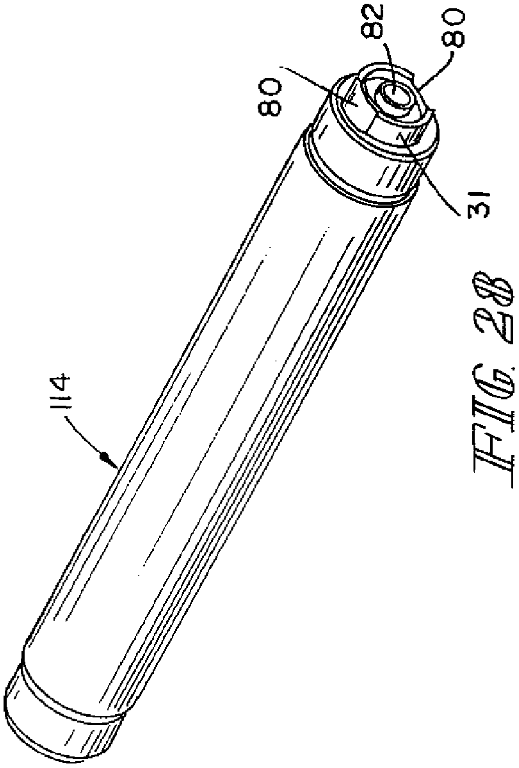
FIG. 28 is a perspective view of an extruded colinear passage piston rod.
Figure 27:
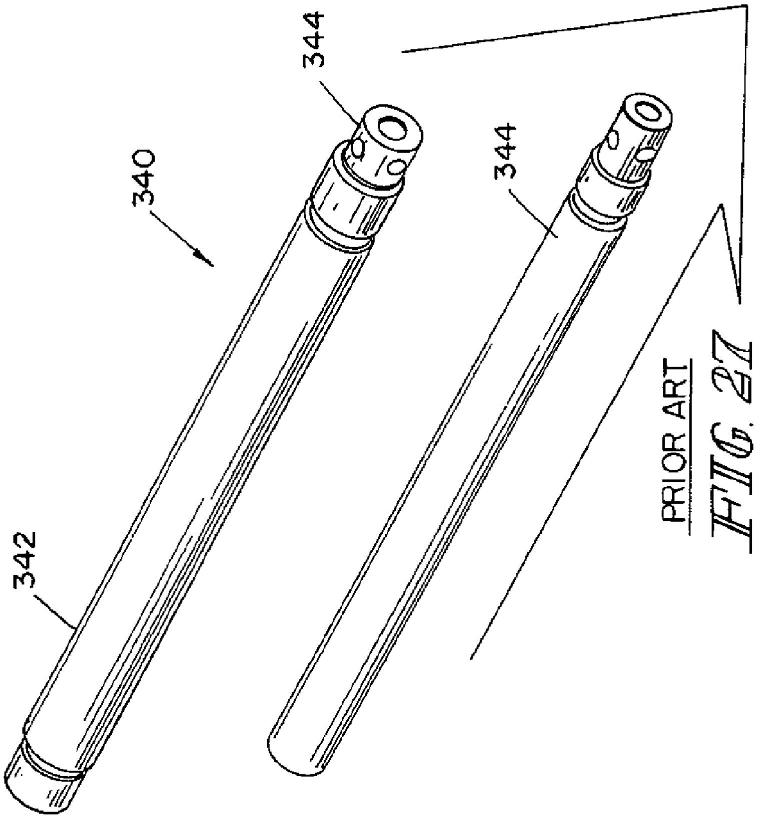
PRIOR ART FIG. 27
FIG. 27 is a perspective view of prior art extension and retraction tubes.

Perspective views of prior art extension and retraction tubes and parallel passage tube 114 is shown in FIGS. 27, 28, respectively. With respect to the prior art tubes, tube 340 is made by providing an outer tube 342 and inserting an inner tube 344 therein to produce parallel passages. Typically, the inner tube 344 as shown therein is a separate manufactured part that requires attachment to outer tube 342 to create the parallel passage. In contrast, piston rod 114 is formed, along with its parallel passages 80 and 82, via an extrusion process that essentially draws material through a die to form the necessary shapes of the structure. Furthermore, such extrusion manufacturing techniques are known to those skilled in the art. Such a manufacturing process does not require separate manufactured and assembled parts.

Exploded perspective views of a prior art machined jaw 350, as compared to an extruded jaw 11A, are shown in FIGS. 29 and 30, respectively. As shown in the prior art design of FIG. 29, jaw 350 shows several bores and insets that must be machined out from a solid piece of material. Furthermore, because the jaw arm 350 is machined, bearing inserts 352 and 354 are required to be fitted into machine bores 356 and 358 to provide a bearing surface. Typically, the bearing material is applied to the insert which is disposed in the jaw. In contrast, the extruded jaw 11A and associated bores may simply receive a coating of fluorocarbon material such as Teflon, or other bearing material such as lubricant filled Nylon, ultra-high molecular weight polyethylene, or other wear resistant polymer. What becomes evident by comparing the two jaws 350 and 11A is that jaw arm 350 includes substantially more material around its bores 356 and 358, then as required by the extruded jaw 11A. Because machined jaw 350 comprises relatively substantially more material than extruded jaw 11A, jaw 350 may be relatively heavier than jaw 11A which has its excess, non-structural material removed. Attempting to mill jaw arm 350 to the shape of extruded jaw 11A may increase expense. The extruded components may also decrease restrictive tolerance requirements in the jaw due to bearing outer diameters and bearing bores in the jaw.

Perspective views of a prior art base and base 360 member 1A are shown in FIGS. 31 and 32, respectively. The prior art base 360, like jaw 350, is a machined piece. Base 350 also requires separately formed air tubes 32 to be inserted into milled cavities 33. All of this effort is to accomplish the same task that extruded base member 1A accomplishes with extruded fluid passages 102 and 103 formed therein.

Figures 33A, 33B, 33C, 33D:
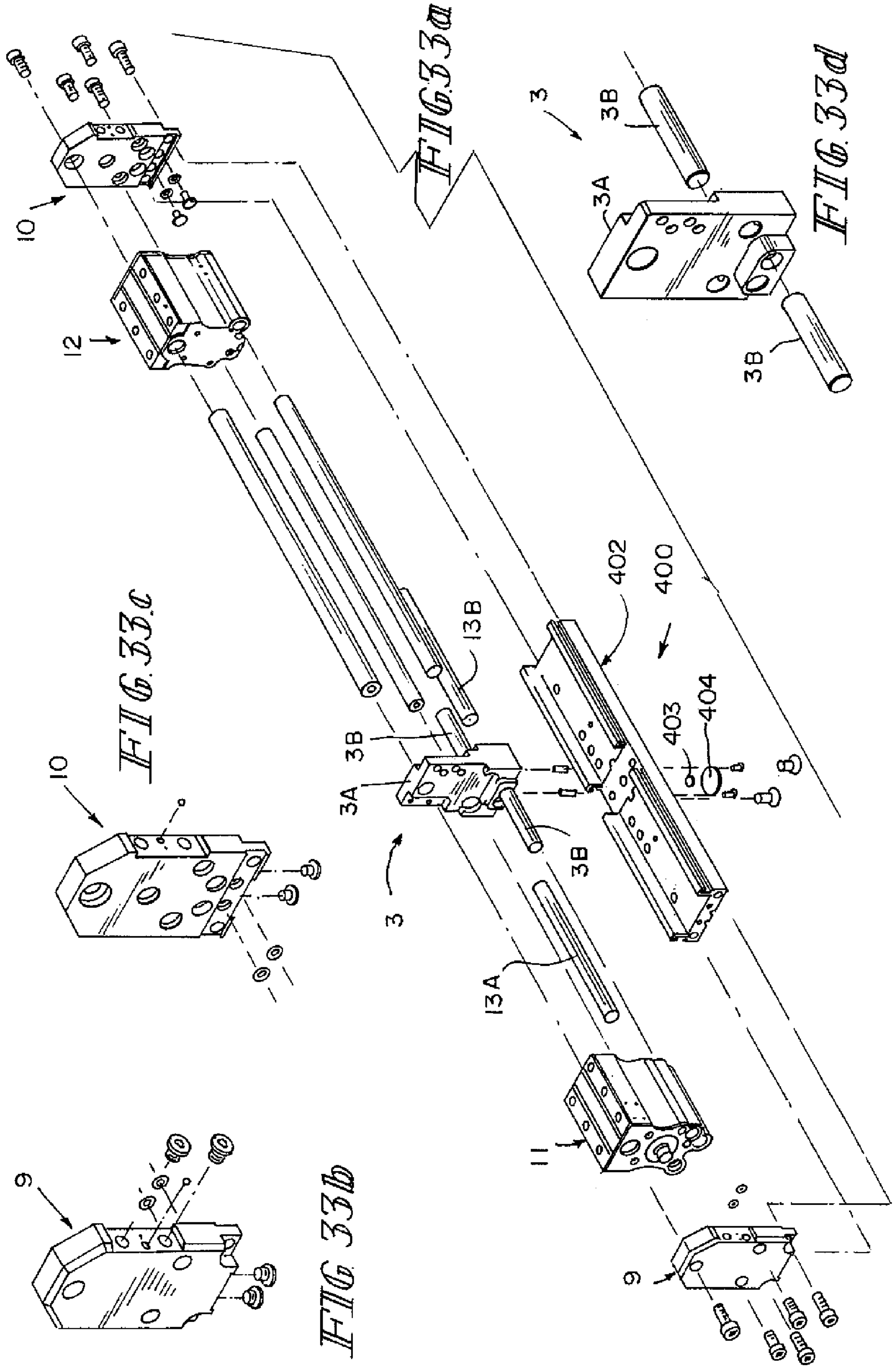
FIGS. 33*a-d* are various perspective exploded views of another illustrative embodiment of a long travel gripper assembly including the jaw arms being non-synchronized.
Figures 34A, 34B, 34C, 34D:
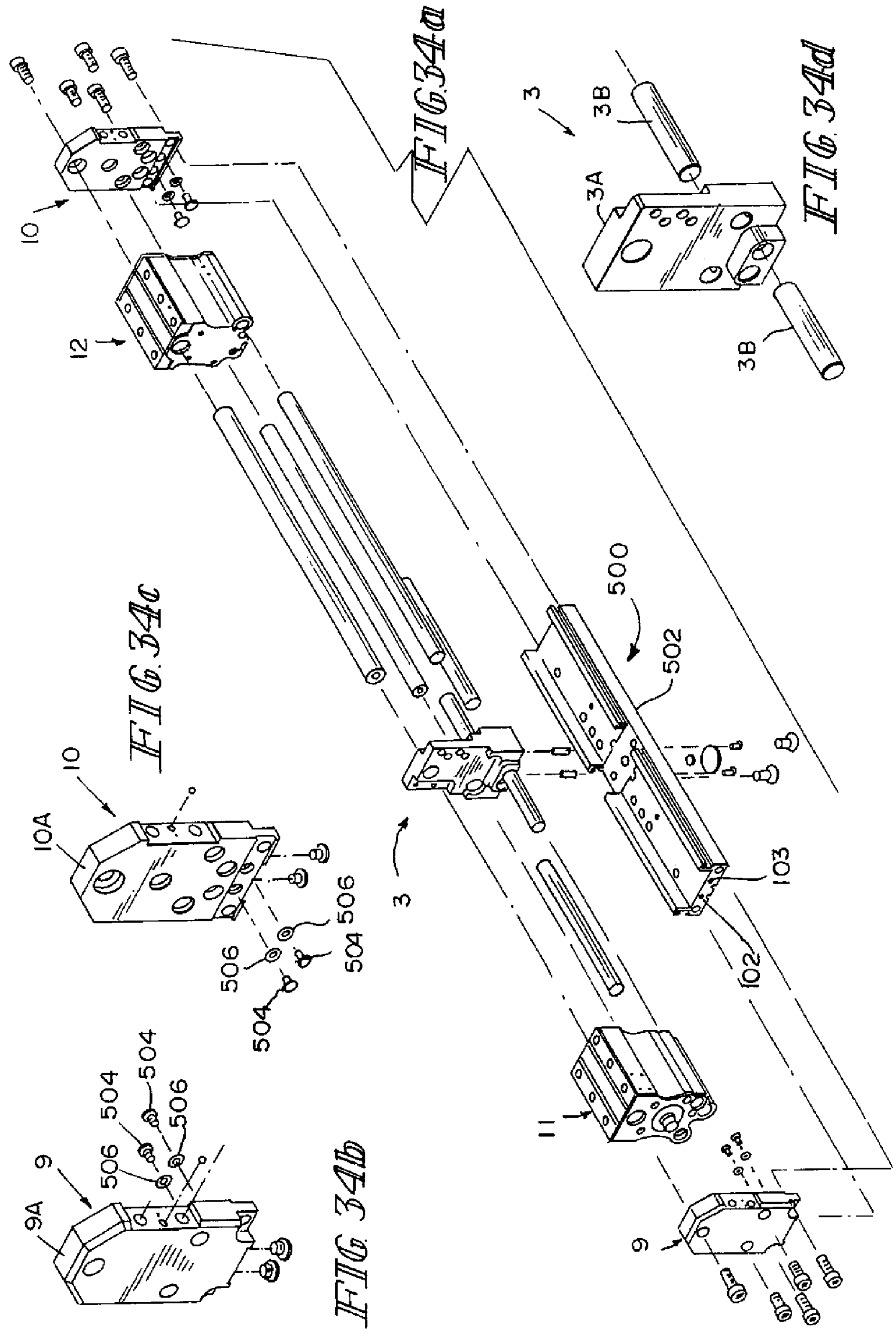
FIGS. 34*a-d* are various exploded perspective views of portions of another illustrative embodiment of a long travel gripper including being a non-synchronized gripper assembly with independent jaw arm movements.

Several exploded perspective views of another illustrative embodiment of a long travel gripper assembly 400 is shown in FIGS. 33*a-d*. The embodiment of gripper 400 is similar to that of gripper 100 with the exception of jaw assemblies 11 and 12 engaging a synchronizer assembly. In contrast to the exploded view of assembly 100 in FIG. 2, assembly 400 in FIG. 33*a* does not include racks 8A and B, nor pinion 3D. (Compare to FIG. 4.) In this embodiment, sleeves 13A and 13B may optionally remain, as well as collars 3B shown coupled to center plate 3A. In addition, end cap assemblies 9 and 10 shown in FIGS. 33*b* and *c*, respectively, can be the same as end cap assemblies 9 and 10 used in gripper assembly 100. As shown in FIG. 33*d*, however, center plate assembly 3 no longer requires upper and lower pinion bearings 3C and 3E, nor pinion 3D, as shown in FIG. 4. Base member 402 can be fitted with a seal 403 and cover plate 404, since there is no longer a need for a rotational sensor to extend therefrom. This does allow, however, the same base member that is used with respect to embodiment 100 to also be used with embodiment 400 if economics so dictate. The essence of this illustrative embodiment allows travel of jaw arm assemblies 11 and 12 without the added use of a synchronizing assembly. Such movement of the jaws can be useful in particular applications. For example, it may be desirable to allow the jaws to move independently to the location of a fixed part in order to grasp it. Although powered by the same source, the jaws move independently and are not constrained to close or open symmetrically with respect to the gripper center plate. In addition, parts may also be physically retained in a "nest" and with non-synchronized jaw actuation, the jaws can comply to the location of the part so as not to cause binding or damage to the part.

Several exploded perspective views of various subassemblies of another illustrative embodiment of a long travel gripper 500 is shown in FIGS. 34*a-d*. This embodiment is similar to embodiment 400 shown in FIGS. 33*a-d* in that no synchronizing assembly is employed. The distinction between assembly 500 and either assemblies 400 or 100 is that independent fluid sources are contemplated to act on jaw assemblies 11 and 12 separately. Because of this, there is no need for fluid passages 102 or 103 to be formed in base member 502. In the illustrated embodiment, both fluid passages 102 and 103 are shown, but that is simply to demonstrate that the same base member, such as base member 1A used in embodiments 100 and 400 can be used in embodiment 500 as well. When this is the case, end cap 9A and end cap 10A can be modified to include plugs 504 that are disposed through seals 506, to prevent fluid from passing through either passages 93 or 94 and into passages 102 and 103. (See, also, FIG. 14.) In contrast to gripper assemblies 100 or 400, there is no desire to have fluid flowing between end cap assemblies 9 and 10. Such individual actuation of the jaws could be beneficial for grasping two different workpieces independently, provided an appropriate configuration of gripping attachments is employed. Also, one jaw could be kept in a stationary position to serve as a datum while the other jaw is independently actuated to reposition workpieces toward the stationary jaw. This allows workpieces to be consistently located with respect to the datum.

Figure 35A:
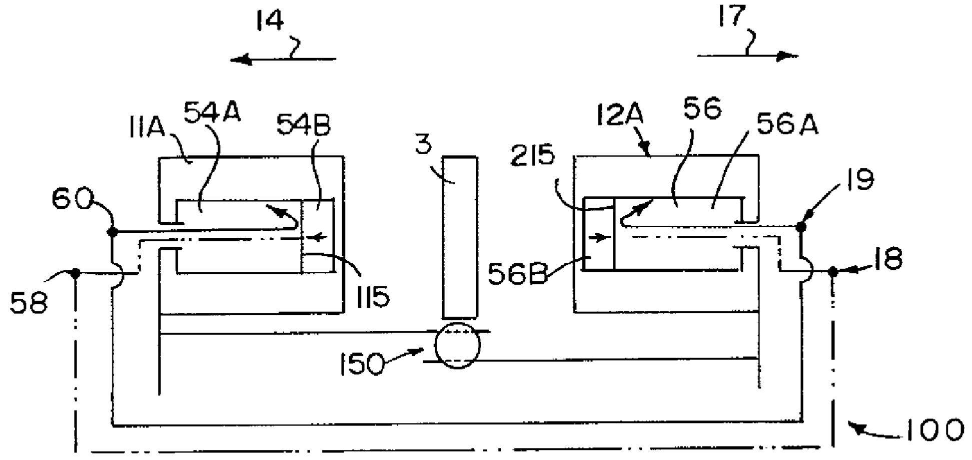
FIGS. 35*a-c* are illustrative schematic diagrams showing the fluid flow provided to the jaw arms.
Figure 35B:
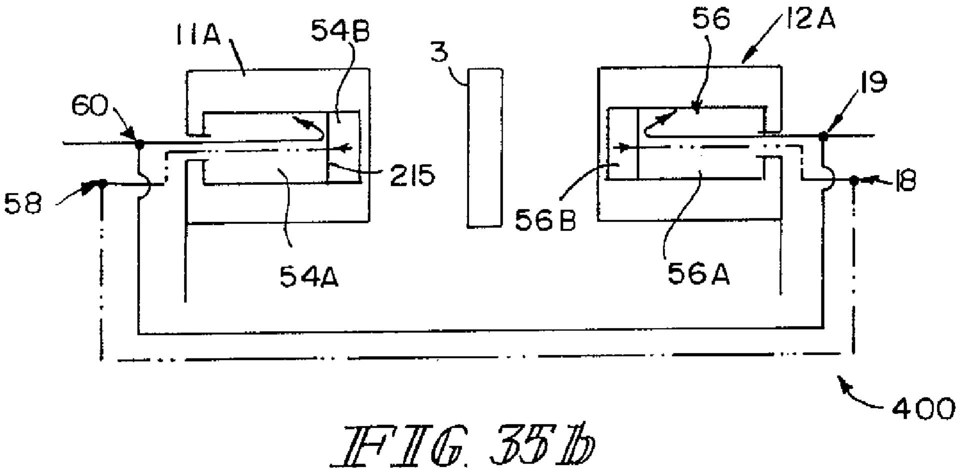
Figure 35C:
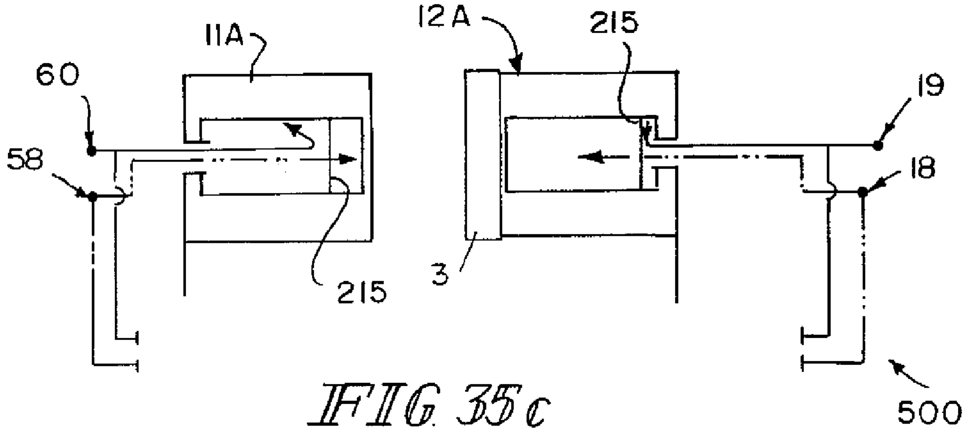

To illustrate the desired air flow between embodiments 100, 400, and 500, schematic diagrams illustrating such is shown in FIGS. 35*a-c*. The fluid flow of long travel gripper assembly 100 is shown in FIG. 35A. It is noted that this embodiment includes synchronizing assembly 150. As shown herein, fluid is provided to port 60 which supplies fluid to cavity portion 54A causing jaw 11 to move in the open direction 14. At the same time, fluid travels through end cap 9A, base member 1A, and up through end cap 10A so that fluid can enter cavity portion 56A of jaw arm 12A to move the same in direction 17 towards the open position. Essentially, both jaw arms 11A and 12A are simultaneously pressurized and with the synchronizer move in synchronized fashion to the open position. Port 58 remains open so that fluid remaining in chamber portions 54B and 56B, in both jaw arms 11A and 12A, respectively, can expel fluid through end caps 9A and 10A, and port 58. In this instance, ports 18 and 19 remain closed.

Similarly, long travel gripper 400, in FIG. 35*b*, includes open port 60 where fluid can energize jaw arms 11A and 12A in the same fashion as discussed above with respect to long travel gripper assembly 100. The distinction, as shown here, is that there is no synchronizing assembly 150 to provide additional synchronization between jaw arm members 11A and 12A. The jaws may still be substantially simultaneously pressurized through member 1A as shown, but it is only pressurization and its timing that causes both jaw arms 11A and 12A to move, in this case to the open position.

In contrast, long travel gripper 500 is shown in FIG. 35*c* which relies on separate ports 58 and 60 in end cap 9A and ports 18 and 19 in end cap 10A to independently provide fluid to respective jaw members 11A and 12A. As can be seen here, there is no fluid transmission occurring between jaw assemblies 11A and 12A via any base member. This is why two separate power sources are employed. In this specific embodiment, the separate power sources are providing fluid, independently, to port 58 and 18 to each respective jaw arm members 11A and 12A. To the extent the jaw arms operate in unison is dependent upon the controlling of the fluid sources.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A long travel gripper comprising:

first and second end caps;

first, second and third guide rails extend between the first and second end caps;

wherein the first, second and third guide rails are parallelly spaced and each having a cross-section that is positioned at an acute angle with respect to each other;

first and second jaws, each receiving the first, second and third guide rails;

wherein the first and second jaws move rectilinearly along the first, second and third guide rails;

a first piston assembly comprising:

a first piston rod located between the first, second and third guide rails;

wherein at least a portion of the first piston rod is disposed in a portion of the first jaw; and a first piston coupled to the first piston rod and located in a cavity in the first jaw;

wherein the first piston assists moving the first jaw; and a second piston assembly comprising:

a second piston rod located between the first, second and third guide rails;

wherein at least a portion of the second piston rod is disposed in a portion of the second jaw; and a second piston coupled to the second piston rod and located in a cavity in the second jaw; and wherein the second piston assists moving the second jaw.

2. The long travel gripper of claim 1, wherein the first piston rod is located at a center of torsion between the first, second and third guide rails, and the second piston rod is located at a center of torsion between the first, second and third guide rails.

3. The long travel gripper of claim 2, wherein the first piston rod is coupled to the first end cap and the second piston rod is attached to the second end cap.

4. The long travel gripper of claim 1, further comprising a base that extends between the first and second end caps, wherein the base comprises at least one fluid passage longitudinally disposed therethrough, and wherein the base and the at least one fluid passage is formed via an extrusion process.

5. The long travel gripper of claim 4, wherein the base comprises a key configured to engage a receiver located on the first end cap for selective positioning of the base relative thereto.

6. The long travel gripper of claim 1, further comprising a synchronizing assembly that synchronizes movement of the first and second jaws.

7. The long travel gripper of claim 6, further comprising a sensor assembly that detects positioning of the synchronizing assembly to determine positioning of the first and second jaws.

8. The long travel gripper of claim 1, wherein the first piston further comprises: first and second seals spaced apart from each other and disposed about the periphery of the first piston; and a support ring located about the periphery of the first piston between the first and second seals; wherein the support ring is movable with respect to the piston.

9. The long travel gripper of claim 8, wherein the support ring is located in a channel disposed about the periphery of the first piston, and is configured to be movable within the channel.

10. The long travel gripper of claim 1, wherein a single power source supplies power to the first and second pistons which move their respective first and second jaws.

11. The long travel gripper of claim 10, wherein the single power source is a fluid power source.

12. The long travel gripper of claim 11, further comprising fluid ports provided on the first and second end caps; a base that extends between the first and second end caps is provided that further comprises open and close fluid passages that are in communication with their respective open and close ports, and are in fluid communication with the first and second pistons to move the first and second jaws.

13. The long travel gripper of claim 1, further comprising at least two power supplies to independently control the first and second jaws; wherein a first power supply distributes power to the first jaw and the second power supply distributes power to the second jaw.

* * * * *